(12) United States Patent  (10) Patent No.: US 7,509,768 B2
Maca  (45) Date of Patent: Mar. 31, 2009

(54) FISHING ROD AND METHOD OF MANUFACTURE

(76) Inventor: Wayne J. Maca, P.O. Box 429, 205 N. Madison, Twin Bridges, MT (US) 59754

( * ) Notice: Subject to any disclaimer, the term of this patent is extended or adjusted under 35 U.S.C. 154(b) by 0 days.

(21) Appl. No.: 10/853,549

(22) Filed: May 24, 2004

(65) Prior Publication Data

US 2004/0244266 A1 Dec. 9, 2004

Related U.S. Application Data

(60) Provisional application No. 60/473,174, filed on May 23, 2003.

(51) Int. Cl.
    *A01K 87/00* (2006.01)
(52) U.S. Cl. .................................. 43/18.1 R
(58) Field of Classification Search ............. 43/18.1 R, 43/18.1 CT; 428/188, 36.1
    See application file for complete search history.

(56) References Cited

U.S. PATENT DOCUMENTS

| 1,645,812 | A |   | 10/1927 | Lane |
| 1,799,501 | A | * | 4/1931 | Casler ................ 43/18.1 R |
| RE18,365 | E | * | 3/1932 | Anderson .............. 43/18.1 CT |
| 1,932,986 | A | * | 10/1933 | Powell ................ 43/18.1 R |
| 2,537,488 | A |   | 1/1951 | Stoner |
| 3,442,738 | A | * | 5/1969 | Trewhella et al. ........... 156/161 |
| 3,835,569 | A |   | 9/1974 | Gould, III et al. |
| 4,083,140 | A |   | 4/1978 | Van Auken et al. |
| 4,968,545 | A | * | 11/1990 | Fellman et al. ............ 428/36.1 |
| 5,229,187 | A | * | 7/1993 | McGinn .................... 428/188 |
| 5,258,087 | A | * | 11/1993 | Symons ..................... 156/210 |
| 6,277,473 | B1 | * | 8/2001 | McGinn .................... 428/188 |
| 2002/0092225 | A1 |   | 7/2002 | Watanabe |

FOREIGN PATENT DOCUMENTS

GB 2293301 3/1996

OTHER PUBLICATIONS

International Search Report, PCT/US04/16420, Nov. 28, 2005.

* cited by examiner

*Primary Examiner*—Kurt Rowan
(74) *Attorney, Agent, or Firm*—Dorsey & Whitney LLP

(57) ABSTRACT

The present invention provides for fishing rods and methods of assembling fishing rods utilizing novel techniques including microscopic inspection and acoustic analysis to assess construction component as well as assembled fishing rods. As such, the present invention utilizes these techniques for measuring the quality and density of the bamboo fibers, which can be a basis for the selection of culms, strips of bamboo, and assembled rod blanks. The present invention also provides construction methods used to remove cell and fiber material combined with the application of epoxy reinforcements. Further, the present invention provides a method of connecting bamboo splines together using a combination of epoxy-based adhesive, vacuum pressure, and heat. Fishing rods according the present invention may also include a carbon fiber or fiberglass ferrule.

9 Claims, 27 Drawing Sheets

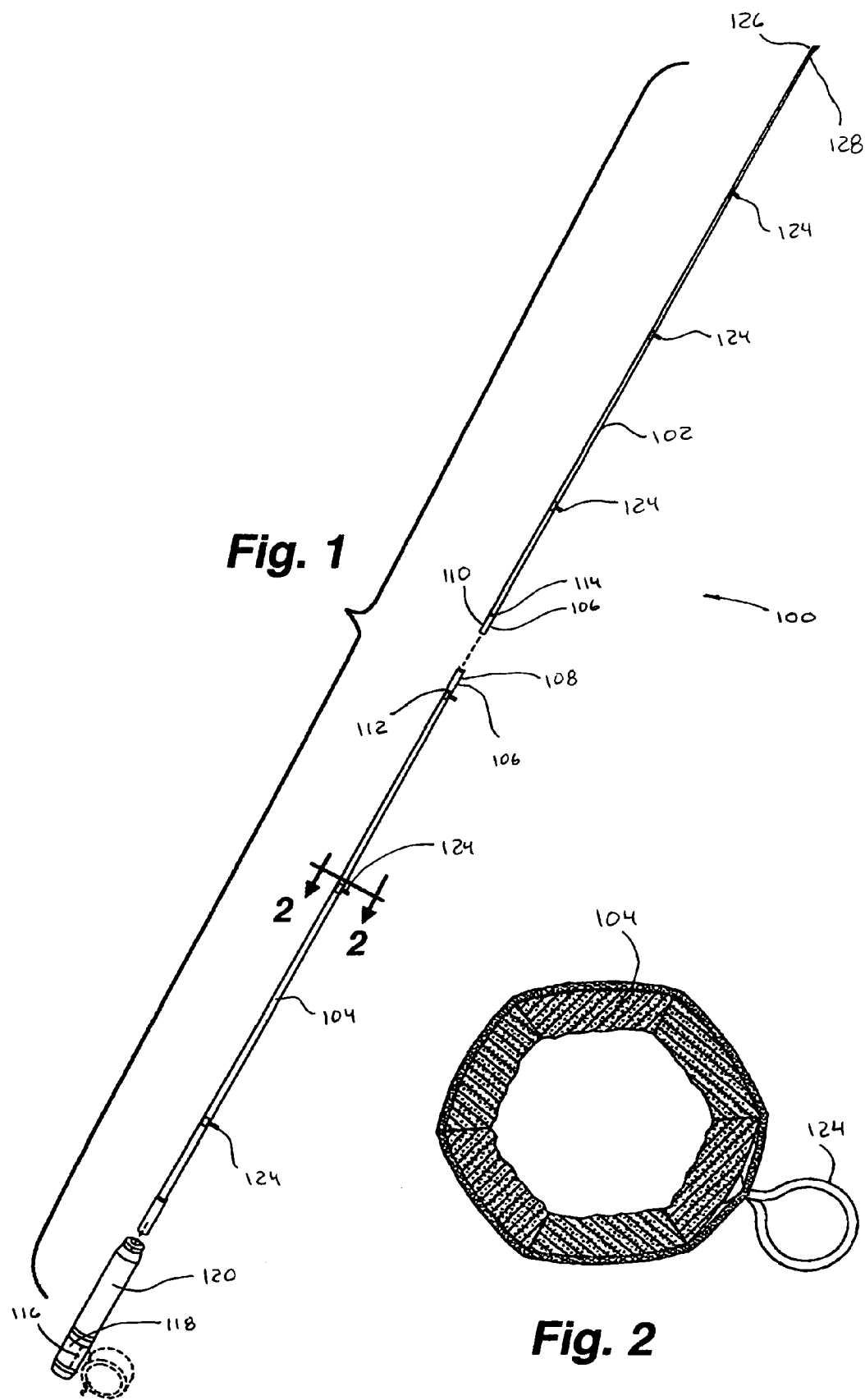

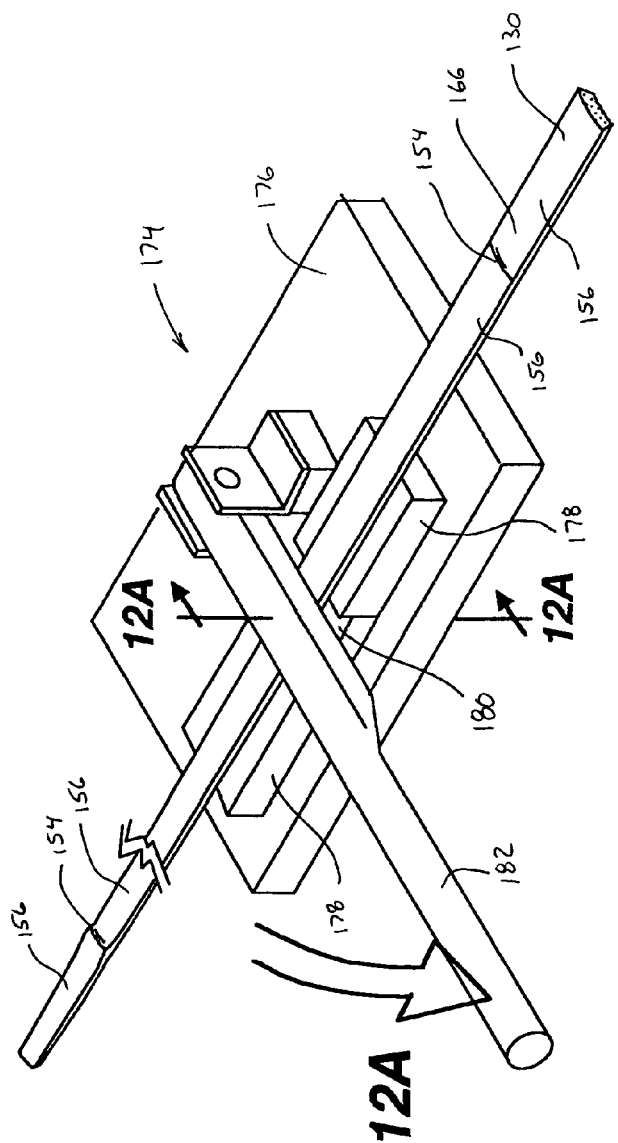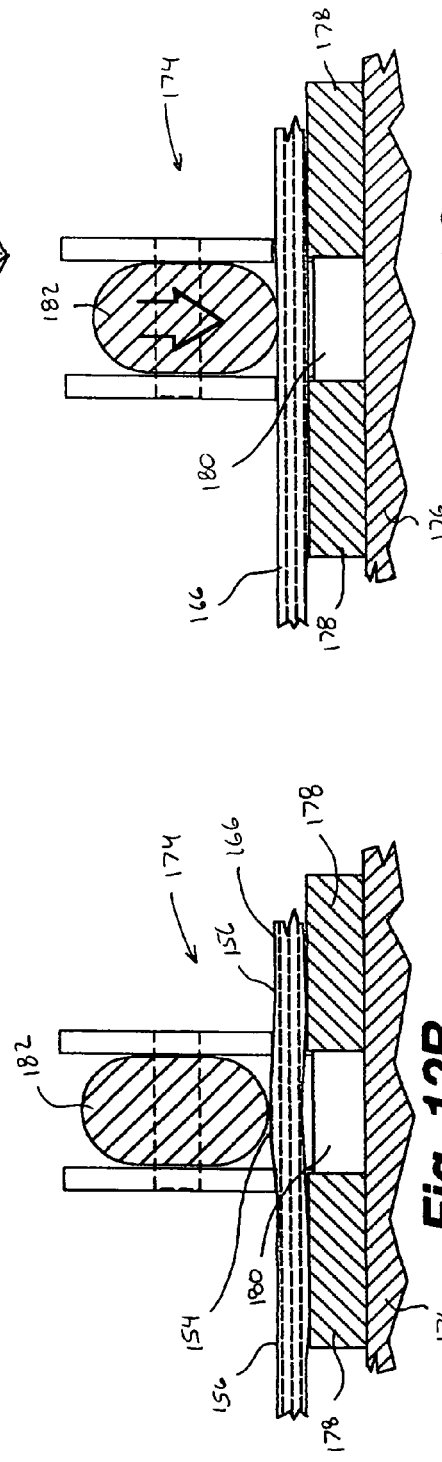

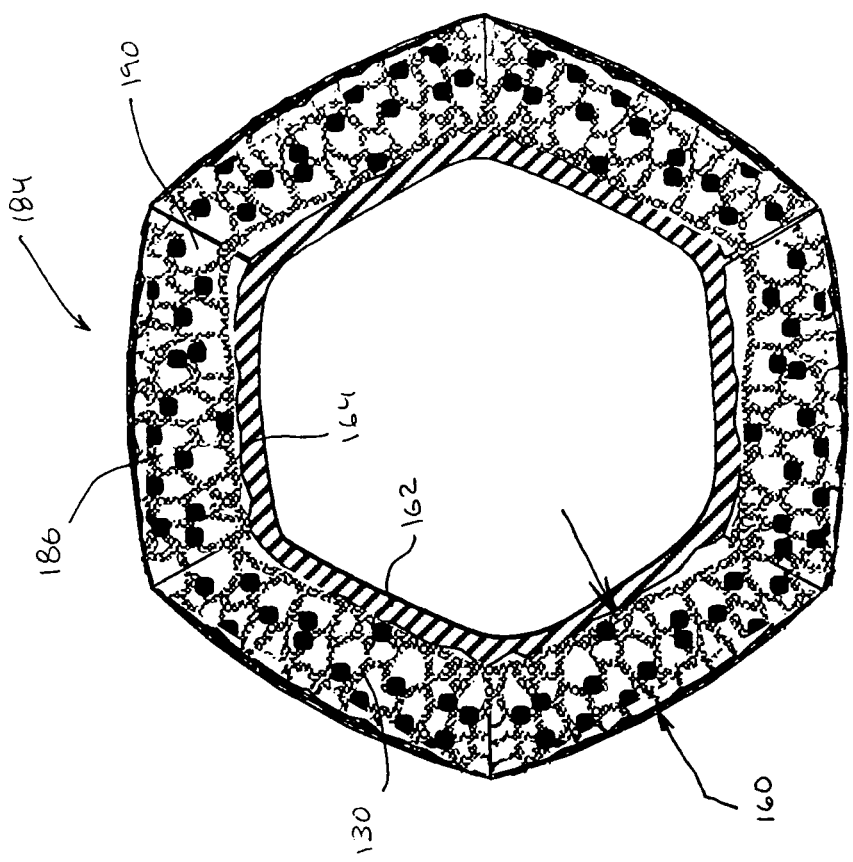
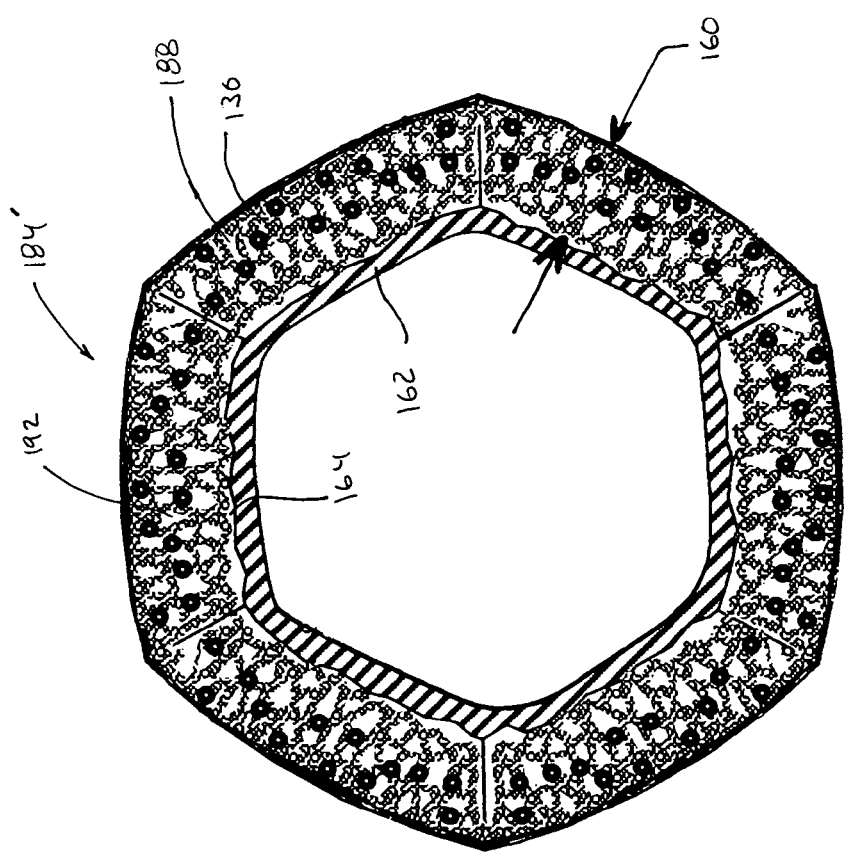

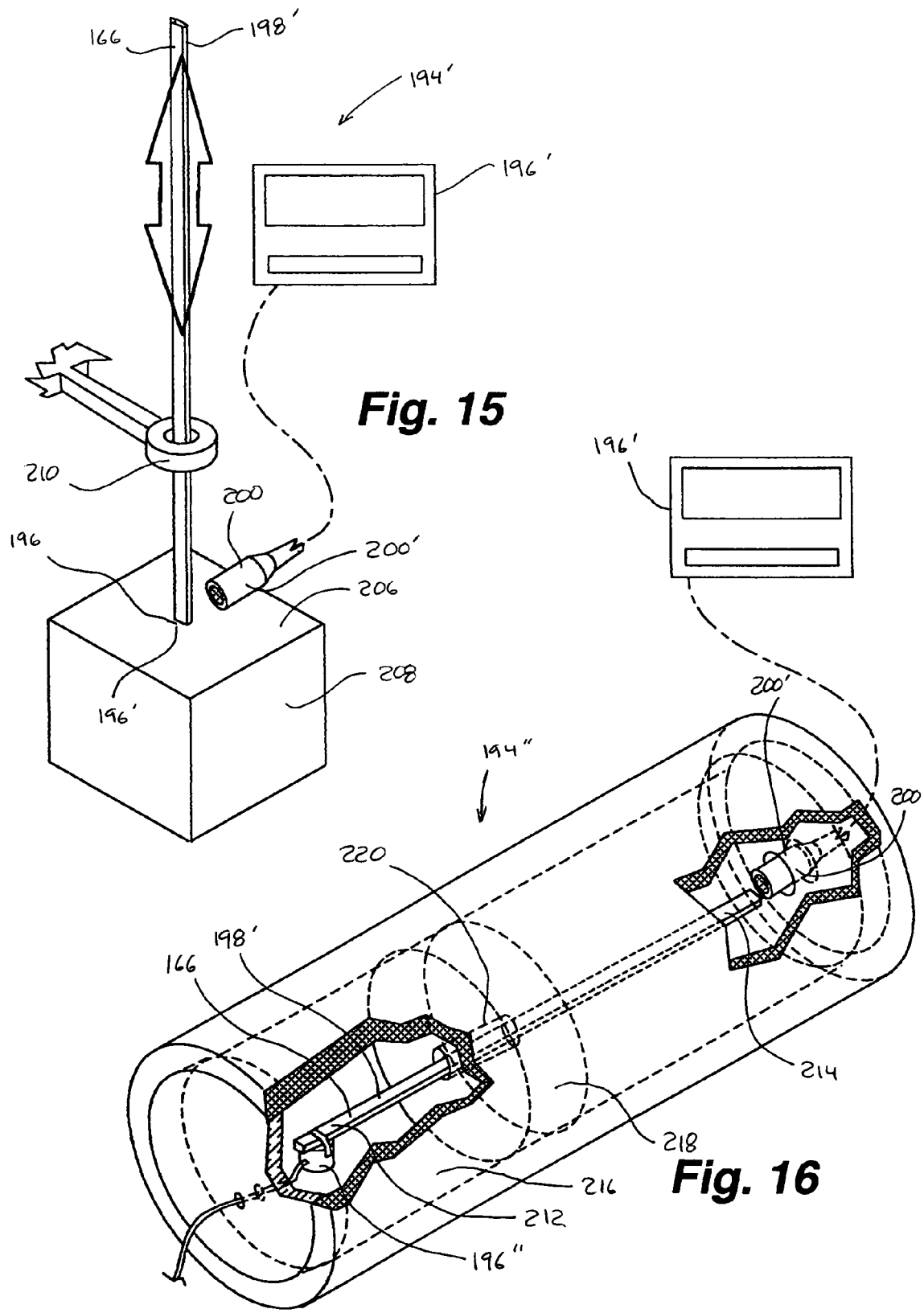

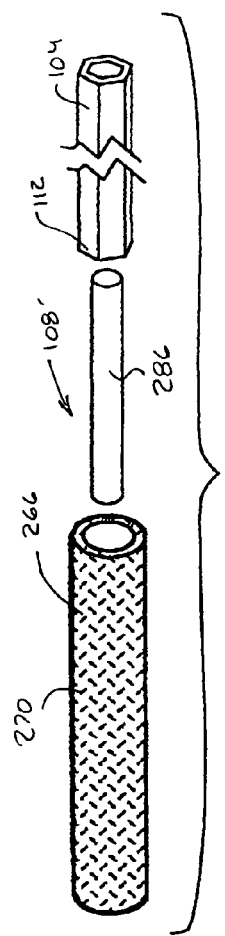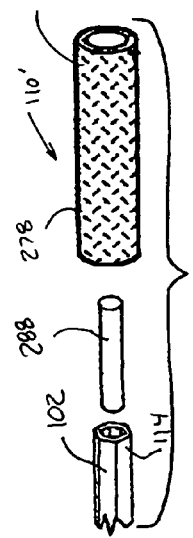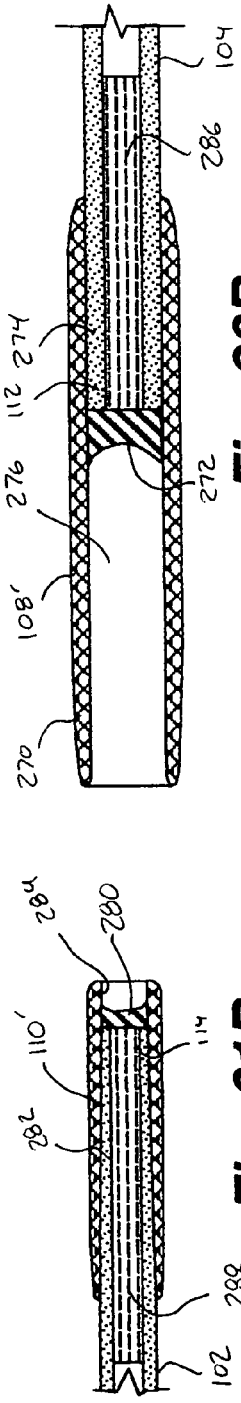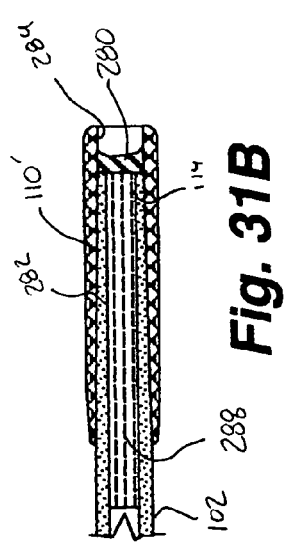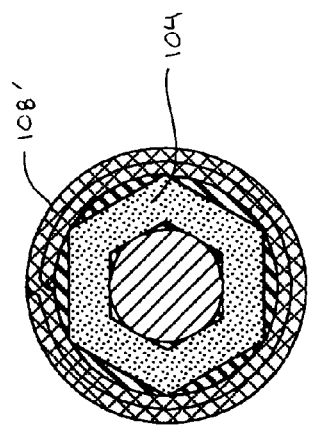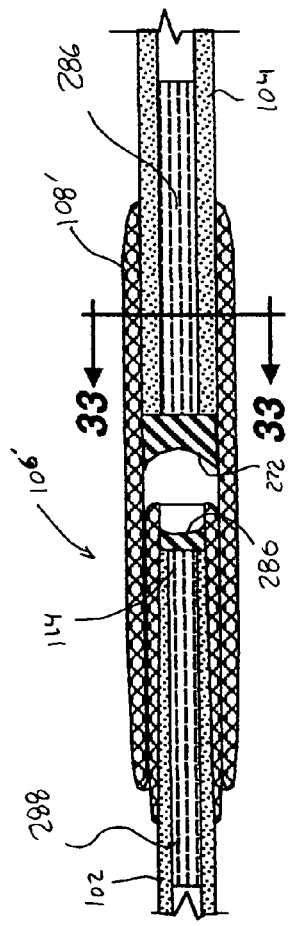

FISHING ROD AND METHOD OF MANUFACTURE

CROSS-REFERENCE TO RELATED APPLICATIONS

This application claims priority to U.S. Provisional Application No. 60/473,174, filed May 23, 2003, hereby incorporated by reference in its entirety as though fully set forth herein.

BACKGROUND OF THE INVENTION a. Field of the Invention

This invention relates to fishing rods, and more particularly, fishing rods constructed from bamboo.

b. Background Art

Fishing rods made of cane have been in use for centuries. Calcutta cane was first used in the 17th century, and until the early 1850's most fishing rods were typically made of a solid piece of tapered wood. Over the years, bamboo has been a material that some manufacturers of rods have never completely abandoned. A small, but significant, number of enthusiastic rod makers have continued to use bamboo, most in traditional ways, even though synthetic materials are available.

Fly-fishing requires a rod that casts a weighted line and its attached fly, to a targeted fish. The fly is essentially a lure, sometimes imitating food for a fish. It is delivered despite wind or adverse weather, around or close to obstacles such as brush or trees, in a manner over distance and with controllable accuracy in a way that does not spook the fish. The speed at which the line travels smoothly determines the carry distance of the fly. The ability of the rod to turn over the line and impart speed smoothly to it is termed its rod action, and conveys the impression of power and control to the user. Although tapered bamboo sticks of the distant past could theoretically achieve this function, most were heavy and not straight, strong, or flexible enough to satisfy the demands of the time.

In the 1850's bamboo culms (the living, then harvested sticks or poles) were first split into strips then straightened, tapered and glued together to provide a splined rod with a solid core. The weight and length of such rods was a distinct disadvantage and the action was correspondingly ponderous. E. C. Powell in 1933, (U.S. Pat. No. 1,932,986) used scalloped bamboo to produce internal reinforcement and decrease rod weight. A variety of tapers were also created, to adjust stiffness and casting performance, a design variant that is still used today, even with synthetic materials such as graphite. Between 1910 and 1950, manufacturers of rods tried alternative materials including steel, which was found to be predictably heavy and would vibrate when cast. Bamboo rod design was influenced by the replacement of animal-hide based glues with synthetic glues and by the availability of improved external finishes. In the early 1940's fiberglass was introduced into rod manufacture, which allowed tubular rod construction and shorter manufacturing time. In the late 1940's to early 1950's fiberglass was combined with polyester and phenolic resins, and the consistency of products made from these materials was quite variable.

In 1946, Stoner (U.S. Pat. No. 2,537,488) patented a new bamboo fishing rod made from splines that had been sculpted and glued to form a polygonal shape with a fluted hollow core. Stoner's design resulted in a lighter, stronger rod. Although the action was improved, the rods were still heavy compared to fiberglass, particularly for extended continuous use. Straightening the assembled bamboo rod blank during many of the steps involved in its production also remains a chore accepted as normal practice with traditional assembly techniques. Fiberglass rods were produced by being wrapped around a mandrel, and the rods were hollow, light and strong and required no straightening as a separate step. The tapers were improved, and as these became more consistent, rods were produced which cast better and required less skill and experience to cast well. By the early 1970's, fiberglass had captured a sizable portion of the fly rod market. There was a corresponding feeling that some of the craftsmanship in rod making had been lost by using the synthetics, and indeed a small number of bamboo devotees persisted in using and producing rods that came increasingly to be regarded as collectors items.

Different types of glass were used later in the 1970's, and graphite was then introduced. It was powerful and fast in terms of action, much easier to learn to cast well, and particularly quick to manufacture, but was notably fragile and prone to sudden breakage. Boron was also tried and was more resistant to breakage, but prohibitively expensive to produce. All the synthetic materials such as fiberglass, graphite, or boron require a chemical and/or heat process to produce the raw material and each fiber produced is fairly uniform in cross-section, but tiny. Synthetics lack the esthetic appearance and "feel" of natural bamboo and are usually limited to somber colors, unless painted or tinted.

It is with this background in mind that the instant invention was developed.

BRIEF SUMMARY OF THE INVENTION

The present invention provides for fishing rods and methods of assembling fishing rods utilizing novel techniques including microscopic inspection and acoustic analysis to assess construction components as well as assembled fishing rods. As such, the present invention utilizes these techniques for measuring the quality and density of the bamboo fibers, which can be a basis for the selection of culms, strips of bamboo, and assembled rod blanks. The present invention also provides construction methods used to remove cell and fiber material combined with the application of a stiffener, such as epoxy, for reinforcement. Further, the present invention provides a method of connecting bamboo splines together using a combination of an adhesive, vacuum pressure, and heat. Different types of adhesive may be used, such as an epoxy-based adhesive. Fishing rods according the present invention may also include a carbon fiber or fiberglass ferrule.

In one form, the present invention provides a fishing rod including a rod including a first length and a second length, and a carbon composite ferrule selectively connecting the first length with the second length.

In another aspect of the present invention, a method of constructing a fishing rod from a plurality of bamboo splines includes the steps of: removing pith from inner walls of the bamboo splines; applying a coating of stiffener to the inner walls of the bamboo splines; gluing the splines together to form a rod having a polygonal cross section; placing the rod in a vacuum; and baking the rod. Another form of the present invention provides a fishing rod produced in accordance with the above method.

In another form of the present invention, a method of constructing splines used to construct a bamboo fishing rod includes the steps of: selecting a bamboo culm; heat treating the bamboo culm; cutting the culm into lengths; inspecting cell structures of cross sections of the culm lengths; splitting the culm lengths into radial strips; smoothing nodes on the radial strips; cutting the strips to a desired width; beveling edges of the strips; and tapering the strips.

In yet another form of the present invention, a fishing rod includes at least two splines of bamboo having beveled edges and rilled inner surfaces coated with a stiffener; and an adhesive connecting the at least two splines together.

The features, utilities, and advantages of various embodiments of the invention will be apparent from the following more particular description of embodiments of the invention as illustrated in the accompanying drawings and defined in the appended claims.

BRIEF DESCRIPTION OF THE DRAWINGS

FIG. 1 is an assembly view of a fishing rod according to one embodiment of the present invention.

FIG. 2 is a cross-sectional view of the fishing rod shown in FIG. 1 taken across line 2-2.

FIGS. 12A-12C show a bending tool for smoothing and straightening nodes on a strip of culm.

FIG. 13A is a representative cross-section of a six-sided bamboo rod having splines with a first cell density.

FIG. 13B is a representative cross-section of a six-sided bamboo rod having splines with a second cell density.

FIG. 15 illustrates an acoustic test arrangement utilizing an impact on a test subject as an excitation source.

FIG. 16 illustrates an acoustic test arrangement utilizing a speaker connected with a test subject as the excitation source.

FIG. 30A is an exploded view of a ferrule assembly on the butt section of the rod blank according to the present invention.

FIG. 30B is cross sectional view of the ferrule assembly connected with the butt section of the rod blank according to the present invention.

FIG. 31A is an exploded view of the ferrule assembly on the tip section of the rod blank according to the present invention.

FIG. 31B is a cross sectional view of the ferrule assembly connected with the tip section of the rod blank according to the present invention.

FIG. 32 is a cross sectional view of the butt and tip sections connected through the ferrule assemblies shown in FIGS. 30A-31B.

FIG. 33 is a cross-sectional view of the ferrule assembly shown in FIG. 32 taken across line 33-33.

DETAILED DESCRIPTION OF THE INVENTION

Figures 3, 4:
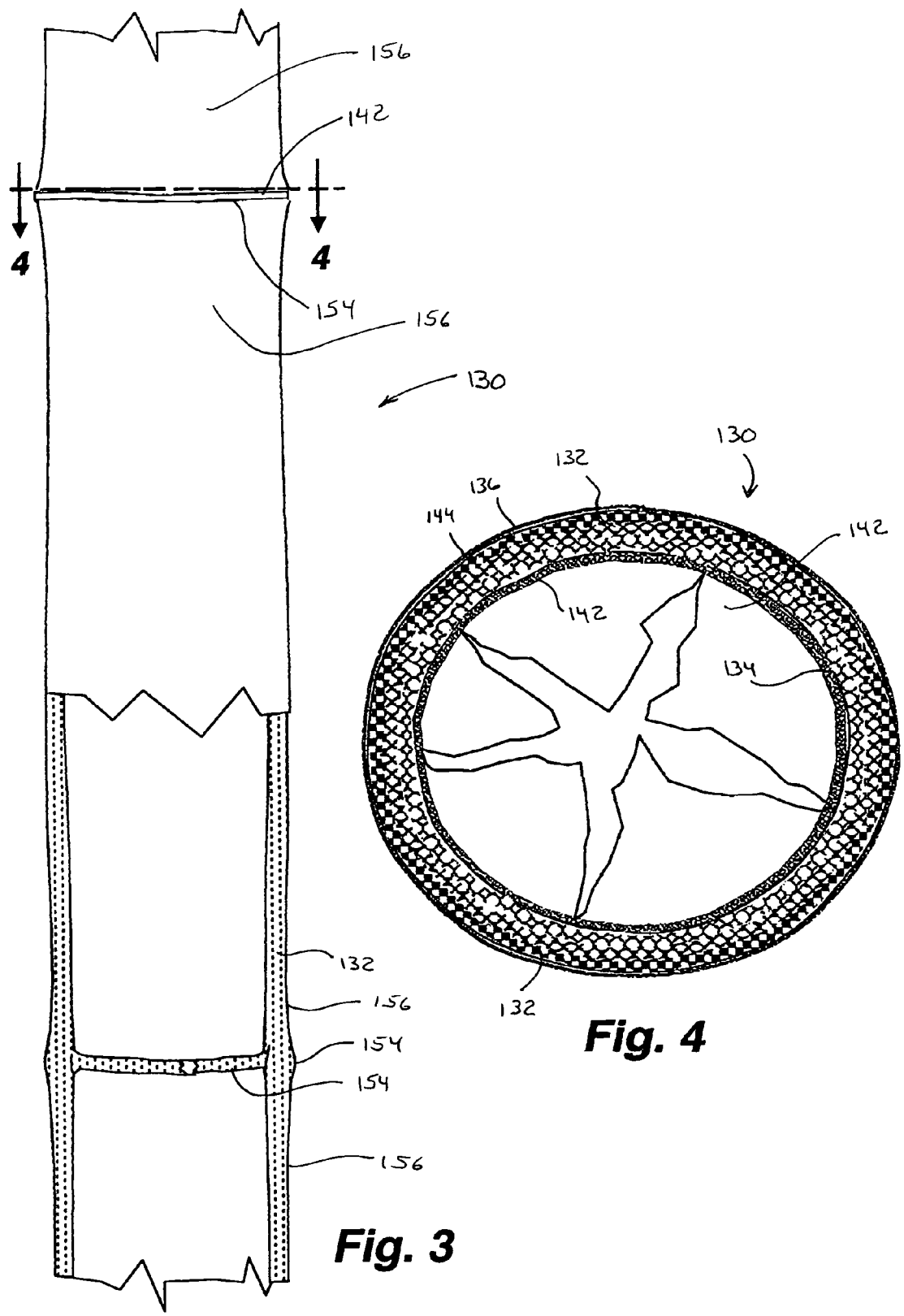
FIG. 3 is a side view of a culm of bamboo.
FIG. 4 is a cross-sectional view of the culm of bamboo shown in FIG. 3 taken along line 4-4.

The present invention provides for fishing rods and methods of assembling fishing rods that overcome some of the disadvantages associated with traditional bamboo fishing rods and with traditional manufacturing processes. Fishing rods and methods of assembling fishing rods according to the present invention utilize novel techniques that include microscopic analysis and matching of bamboo components along with the use of sound to assess construction components as well as assembled fishing rods. As such, the present invention can utilize these techniques for measuring the quality and density of the bamboo fibers, which can be a basis for the selection of culms, strips of bamboo, and assembled rod blanks. The present invention also provides for a multi-step process that features the removal of bamboo cells and fiber combined with the application of a specific epoxy-based reinforcement method, which results in reduced fishing rod weight in combination with increased longitudinal and torsional stiffness. Further, the present invention provides a method of preparing and holding bamboo splines together using a combination of epoxy-based adhesive, vacuum pressure, and heat that results in a consistently straighter, lighter, faster, and stronger rod blank. Fishing rods according to the present invention may also include a ferrule constructed of carbon fiber or fiberglass that provides a smooth and consistent transfer of energy throughout the rod length. It is to be appreciated that although the methods and structures are described below with reference to bamboo fishing rods, many of these methods and structures are applicable to fishing rods constructed from various other types of materials, such as graphite.

As shown in FIGS. 1 and 2, a fishing rod 100 may include a tip section 102, a butt section 104, and a ferrule 106 to selectively connect the tip section with the butt section. It is to be appreciated that although the fishing rod is depicted and described as having two sections, other embodiments of the present invention may include more than two sections. The ferrule 106 includes a female portion (or "receiver") 108 and a male portion (or "insert") 110, wherein the female portion is adapted to receive the male portion. The female portion 108 of the ferrule may be fixedly connected with a ferrule end 112 of the butt section 104, and the male portion 110 of the ferrule may be fixedly connected with a ferrule end 114 of the tip section 102. As such, a user can selectively connect the tip section 102 with the butt section 104 of the rod 100 by inserting the male portion into the female portion of the ferrule. A reel seat 116, a reel seat insert (barrel) 118, and a handle 120 may also be connected with a portion of the butt section 104 near a butt end 122. Line guides 124 may also be connected with the butt section and tip section at various locations along the lengths of each. The tip section 102 may also include a tip top 126 located at a tip end 128. It is to be appreciated that more or less components may be installed on the fishing rod than what is depicted and described herein. In addition, fishing rods constructed according to the present invention may include more than one ferrule, may not include a ferrule, or may include a ferrule configured differently than what is depicted and described herein. For example, in some embodiments of fishing rods, the female portion of the ferrule may be connected with the tip section and the male portion connected with the butt section of the rod.

Figure 5:
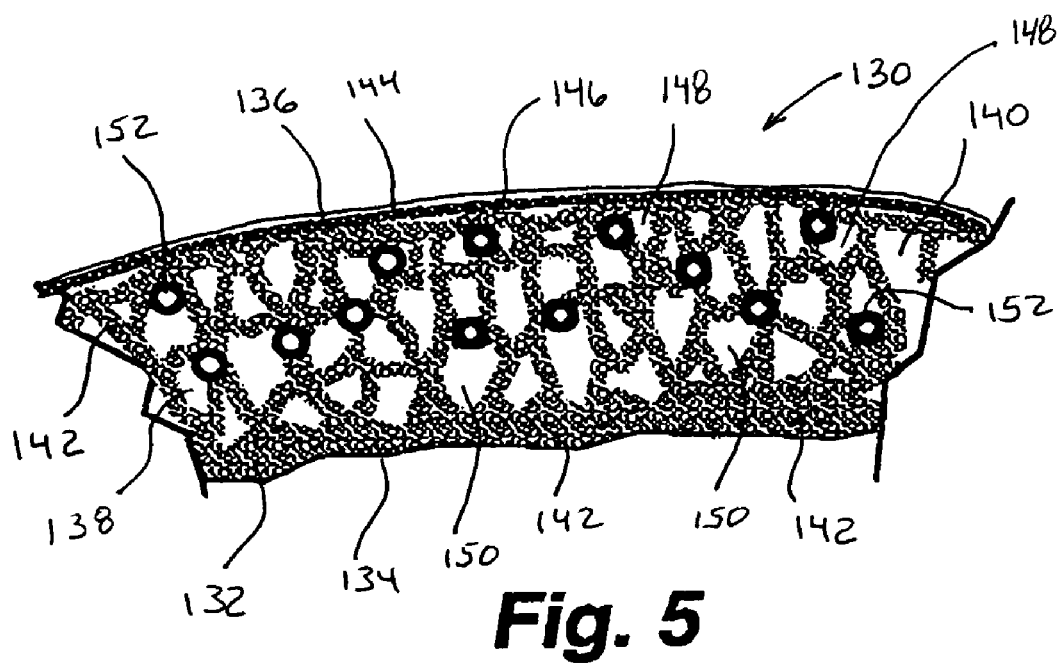
FIG. 5 is a representative cross section of a portion of the sidewall of a culm of bamboo showing a first cell structure.
Figure 6:
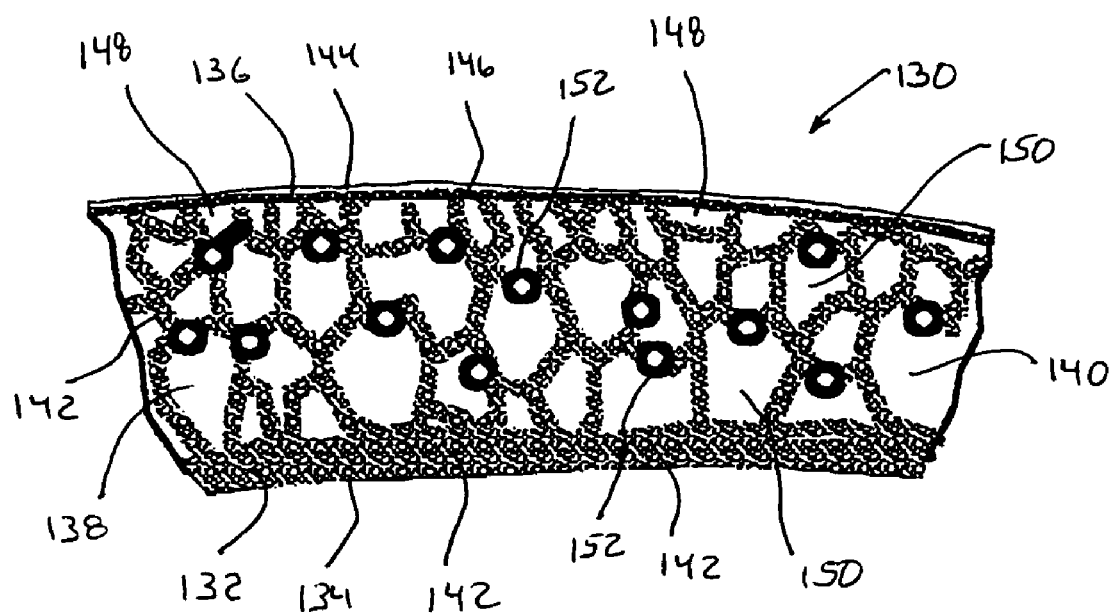
FIG. 6 is a representative cross section of a portion of the sidewall of a culm of bamboo showing a second cell structure.

Bamboo is a renewable product, the production of which requires cultivation and harvesting in a suitable climate. Several varieties of bamboo may be used to construct fishing rods. For example, one specie that may be used with the present invention, *Arundinaria amabilis*, is grown only in the Guangdong Province of China. A culm 130 of bamboo is shown in FIGS. 3 and 4. As illustrated in the partial cross sections of bamboo the culm in FIGS. 5 and 6, the culm has an outer wall 132 having an inner surface 134 and outer surface 136 with layers or walls 138 of cells 140 and pith 142 spaced therebetween. The outer surface is defined by a thin, shiny, dense layer of enamel 144. Although depicted as a solid layer, the outer cell layer 146 of the culm adjacent to the enamel layer 144 is made from a densely packed layer of hard outer cells that contribute to the speed and conductivity of energy along the length of the fishing rod. Irregularly shaped and densely packed small cells 148 are located adjacent to and inside the outer cell layer 146 of hard outer cells. Sometimes the small cells 148 are triangularly-shaped. Located just inside of and adjacent to the layer of small cells are layers of polygonal cells 150. From the layer of small cells 148 toward the inner surface 134 of the culm, the polygonal cells 150 gradually increase in size and are increasingly separated from each other over larger distances by pith 142, which is a weak, spongy tissue. The culm 130 consists of virtually entirely all acellular pith 142 at the inner surface. As shown in FIGS. 5 and 6, small hollow water tubes 152 are also located on the culm between various cells. These tubes 152 may also provide a source of weakness in the bamboo structure.

As shown in FIG. 3, nodes 154 are located at various locations along the length of the culm 130. Nodes are nodular growth points on the outside of the culm, which generally decrease in frequency towards the tip of the culm. At the nodes, pith 142 forms a bridge between the outer walls 132 and inner vertical fibers (not shown) irregularly intertwine to create a knot-like appearance, which creates a point of varying strength compared to the more regular wall between nodes 154. Depressed areas of the wall of the culm 130, referred to as sweeps 156, are located before and after the knotted fibers of the nodes. The nodes appear as irregular areas at intervals along the outer surface of the split bamboo as well as in shaped splines, as discussed below. As such, some embodiments of the fishing rod are constructed with opposing nodes to help eliminate inconsistencies resulting from bends in the component splines to create a regular construction pattern. In other embodiments, the fishing rod is constructed with the nodes removed.

Figure 7:
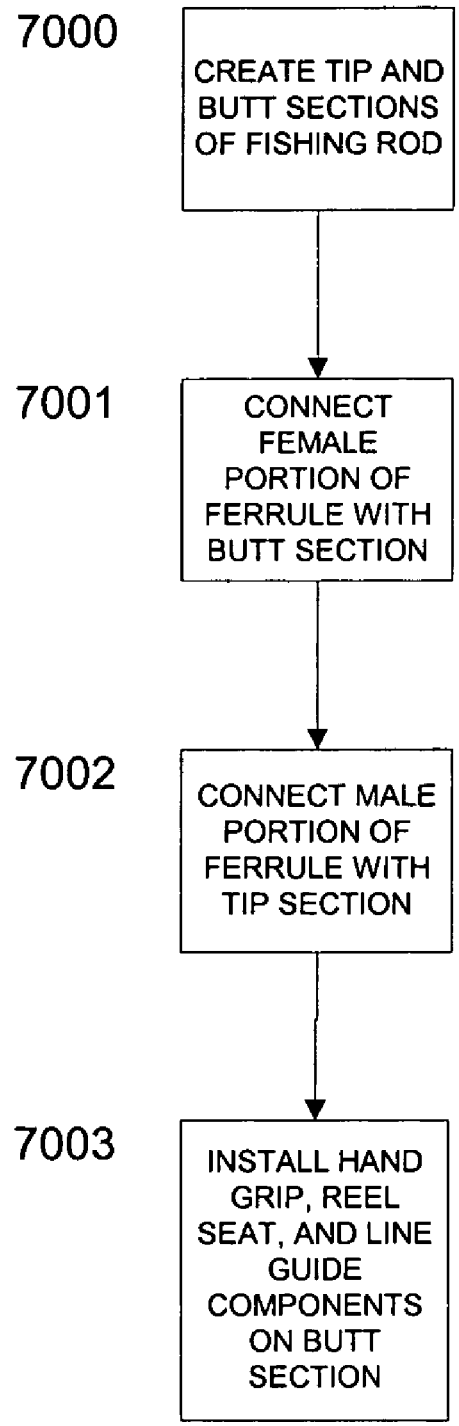
FIG. 7 is a flow diagram of a method for constructing a bamboo fishing rod according to the present invention.
Figure 8:
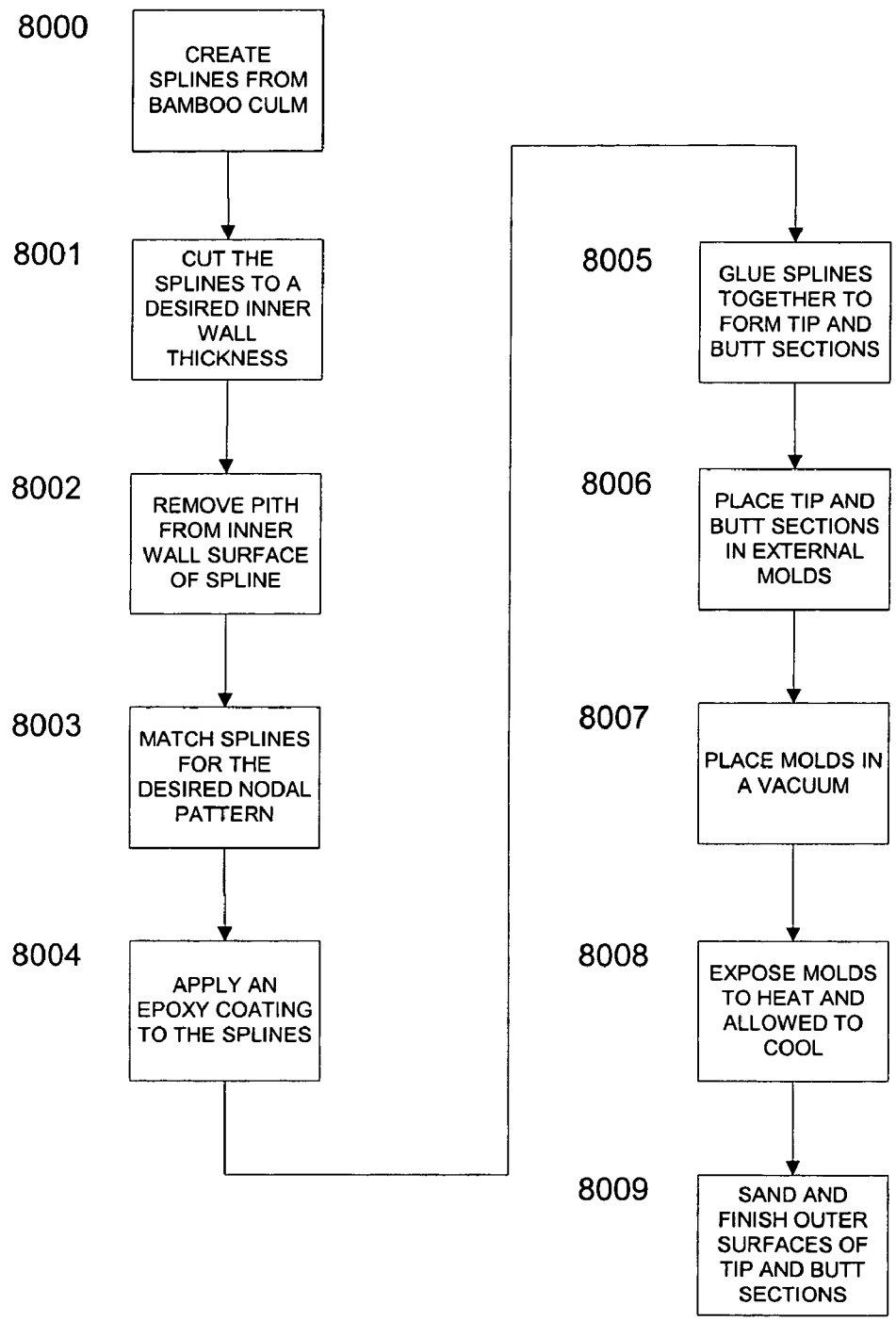
FIG. 8 is a flow diagram of a method for creating rod tip and butt sections of a fishing rod according to the present invention.
Figure 9:
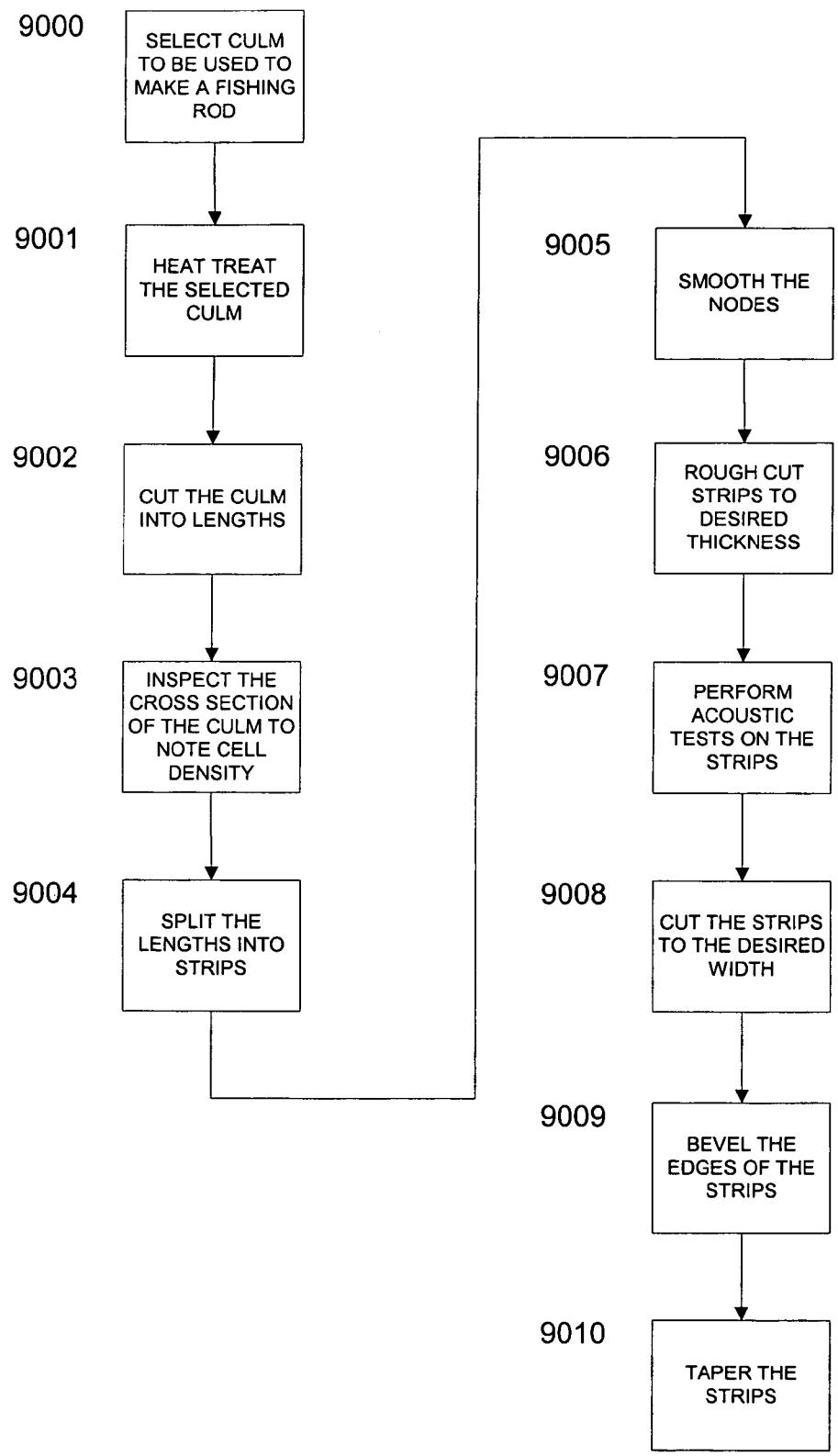
FIG. 9 is a flow diagram of a method for creating splines used to construct tip and butt sections of a fishing rod according to the present invention.

A broad overview discussing various steps that may be utilized when constructing the bamboo fishing rod 100 is set forth below, followed by a more detailed discussion. As such, a method for constructing the bamboo fishing rod is shown in FIG. 7, and methods for creating and assembling components of the fishing rod are illustrated in FIGS. 8 and 9. More particularly, FIG. 8 shows one method for creating the rod tip 102 and butt sections 104, and FIG. 9 shows one method for creating splines used to construct the tip and butt sections of the rod.

As illustrated in FIG. 7 (and referring to FIGS. 1-6), a method for constructing a fishing rod may begin with the broad step of creating the tip 102 and butt sections 104 of the fishing rod 100 from bamboo culm 130 (operation 7000). Once the rod tip and butt sections are constructed, the ferrule portions (108, 110) may be connected with the tip 102 and butt sections 104 (operations 7001 and 7002). The ferrule 106, which is a fitted joint between the tip and the butt sections of the rod, may be made of different types of metal, such as nickel silver. As previously mentioned, the present invention may also include an integrated ferrule constructed of carbon fiber or fiberglass that may be constructed to replicate the modulus of the bamboo's outer fibers. In order to coordinate modular stresses and satisfy simple weight requirements, a triaxial lay-up of carbon fiber may be used to surround an inner reinforcement of the ferrule section. For example, unidirectional carbon fiber may be wrapped with a biaxial woven wrap of carbon fiber. As such, the unidirectional carbon fiber may provide stiffness to the ferrule whereas the biaxial wrap acts to provide hoop strength to the ferrule. Next, the hand grip 120, reel seat components (116, 118), and line guide components may be installed on the butt section (operation 7003). Various components, such as the reel seat 116, reel seat insert (barrel) 118, line guides 124, a stripping guide 123, and tip top 128, together with wraps used to attach these components to the rod along with any protective coatings used on guides or the rod itself may be chosen to compliment each other and the rod's feel and action by rod makers. The term "feel" has been used historically to cover many characteristics. For example, "feel" has been used to include a fishing rod's action, speed, power, and castability in adverse weather conditions, as well as appearance. The order in which the operations shown in FIG. 7 are performed may vary, and should not be construed to be limited to the order depicted.

FIG. 8 illustrates one method for creating the tip 102 and butt sections 104 of the fishing rod according to the present invention. As shown in FIG. 8, a method for creating the rod tip and butt sections may begin with creating splines 158 (also shown in FIGS. 13-13B) from bamboo culm 130 (operation 8000). The splines may then be cut or sanded to a desired inner wall thickness 160 (operation 8001). Next, the hard dense outer bands of cells 148 may be exposed on the inside of the culm by removing the inner softer pith 142 and inert cells from the splines (operation 8002). The pith and inert cells may be removed in various ways and this step or act performed with various tools. For example, removal of the pith and inert cells may be accomplished by micro-rilling, as discussed in more detail below. The splines may then matched for a desired nodal pattern (operation 8003), and some of the removed pith may be replaced with a stiffener 162, which coats, bonds, and stiffens between the remaining cells on the exposed inner surface of the culm, such as a micro-rilled wall surface 164 (operation 8004). Various types of stiffener 162 may be used. For example, one embodiment of the present invention utilizes epoxy as the stiffener. Stiffener may also be applied outer surfaces of the splines. The splines may then be glued together along their lengths (operation 8005) to form the tip 102 and butt sections 104 of the fishing rod. The tip and butt sections may then be held in external molds (operation 8006), placed in a vacuum (operation 8007), and exposed to heat and allowed to cool (operation 8008). Using molds helps to provide straight rod tip and butt sections, which in turn may reduce or eliminate the need for additional straightening of the sections. The outer surfaces of the tip and butt sections may then be sanded and finished (operation 8009). The order in which the operations shown in FIG. 8 are performed may vary, and should not be construed to be limited to the order depicted.

Figure 11:
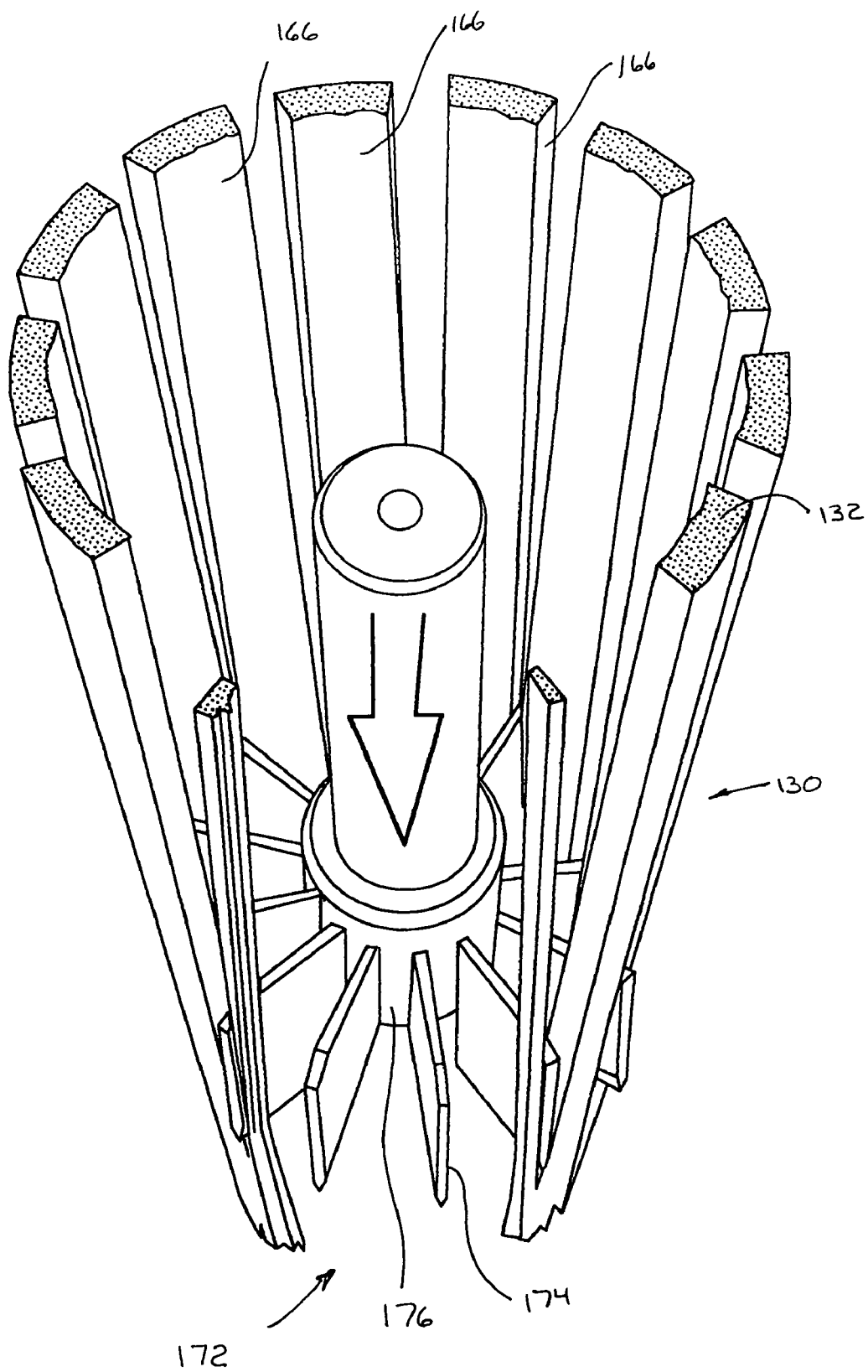
FIG. 11 is a view of a length of culm being split into strips with a radial splitting tool.

FIG. 9 illustrates one method for creating splines 158 according to the present invention. As shown in FIG. 9, a method for creating the splines may begin by first selecting the bamboo culm 130 to be used to construct the rod (operation 9000). The selected culm may then be heat treated (operation 9001) and cut into lengths (operation 9002). The cross sections of the culm lengths may then be inspected to note cell counts, sizes, and/or density (operation 9003). This inspection may be accomplished with the use of various tools, such as a graded reticule. If the cell count, sizes, and/or density is deemed adequate, the culm lengths may then split into strips 166 (as shown in FIG. 11, for example) (operation 9004) and the nodes in the strips may be smoothed (9005). The strips may then be rough cut to a desired thickness (operation 9006), and acoustic profiling or testing may be performed on the strips (operation 9007). Performing acoustic testing the on the strips at this stage of the process can detect potential deficiencies early in the manufacturing process. As such, corrective action can be taken, which may include the selection and use of additional or different materials in the rod construction, such as a replacement strip section. It is to be appreciated that acoustic profiling and matching techniques can be applied at any stage in the manufacturing process from the raw culm to the completely finished rod, and need not be performed only at this stage of the process. Through the acoustic testing, split cane, unfinished or finished splines, and assembled bamboo rod blanks can be assessed for their ability to transmit sound throughout the manufacturing process. Lastly, strips 166 are converted to splines 158 by cutting to the desired width (operation 9008), beveling the edges (operation 9009), and tapering the strips (operation 9010). The order in which the operations shown in FIG. 9 are performed may vary, and should not be construed to be limited to the order depicted.

Figure 10:
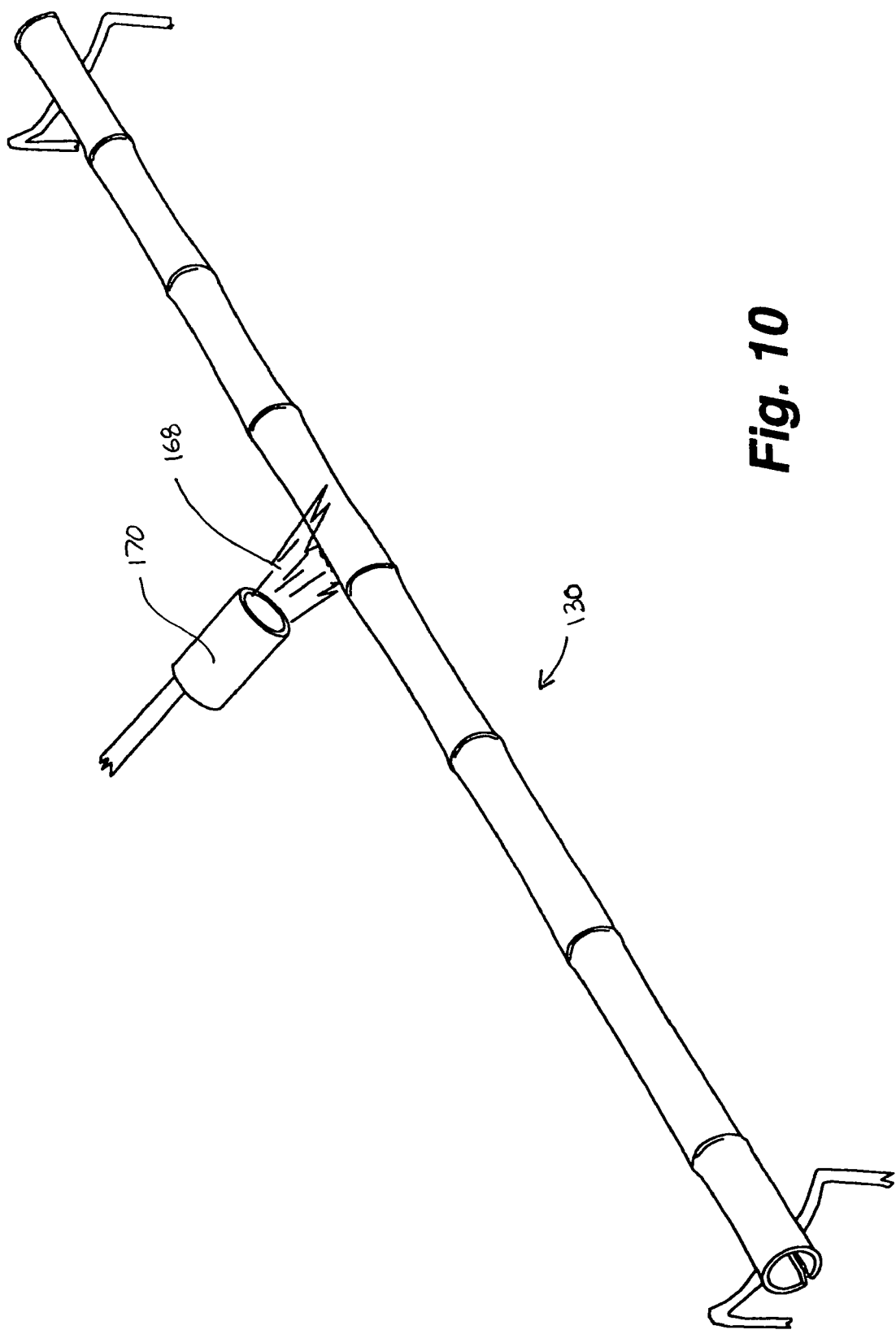
FIG. 10 is a view showing heat treatment of a culm using an open flame from a burner.

Referring again to the flow chart depicted in FIG. 9, a rod builder may base the selection of the bamboo culms 130 (operation 9000) on various criteria. For example, a rod builder may consider weight and visual requirements that give an indication of cell density and cosmetic viability. When considering cosmetic viability, a rod builder may look for scars on the culm resulting from bug bites and/or damage caused by people and equipment during harvesting and shipping. Once the bamboo culm has been selected, the culm may then be heat treated (operation 9001) to produce a hardened and stiffened cane. As shown in FIG. 10, the culm 130 may be heat treated with an open flame 168 from a burner 170. Various sizes of burners may be used to flame treat the culm. For example, one embodiment of the present invention utilizes a 20,000-35,000 btu burner. Flame treating or "flaming" the culm may be progressively advanced along the length of the culm starting at one end and moving to the other end to produce a color of desired tone and quality, which may range from dark honey to chocolate brown. The culm may also be heat treated to varying depths. For example, in one embodiment of the present invention, the culm is heat treated to a depth of 0.100 inches. To insure adequate depth of heat treatment, the flame may be reduced in temperature and the process of flaming lengthened with respect to time for lighter or smaller sections of culm. Flaming denatures the protein of the wood, which creates hardening and forces retained moisture and sap from the culm. The moisture and sap may emerge as steam and liquid from the end of the culm during the flaming process.

As shown in FIG. 9, once the culm 130 has been heat treated, the culm may then be cut into lengths (operation 9002). The number of lengths depends on the number of sections required to complete the finished rod. For example, the culm is cut into two lengths when constructing a fishing rod having a butt section and a tip section. The culm is not cut into separate lengths when constructing a single piece fishing rod. The culm lengths may then be inspected under magnification to assess the cell bundles (operation 9003). Microscopic examination of multiple cross-sections of the culm lengths may be accomplished with a graded reticule that provides direct counts of cells similar to a fiber count in composite constructions. The presence of spaces between cells is noted and adjustments in construction may be made.

As discussed below, decisions based on the cell counts may also be further qualified by acoustic profiling.

Noting cell counts, size, and/or densities may provide a rod builder with an indication as to how the strip will contribute to a completed fishing rod's feel and action as well as possible steps that might need to be taken to strengthen the strip. For example, when compressed, cell bundles can move laterally and fail to return to position on the side of the compressing force. Lateral movement of cell bundles may result in buckling of the cane, which is termed "a set," and during extreme use, can result in breakage of the rod. The cell density and cell count in the outer radial portions of the bamboo culm may help determine the choice of stiffener used to reinforce the inner wall, as discussed in more detail below. In one embodiment of the present invention, the density and cell count in the outer 0.070 inches of the bamboo culm are particularly noted. Where widely spaced cell structures are present, a higher modulus epoxy may be chosen to reduce the potential for lateral movement of cell bundles during compression. In one embodiment of the present invention, the widths of the individual cells contained in the layer of small cells 148 adjacent to the outer hard layer 146 are particularly inspected (see FIGS. 5 and 6). An average small cell width of 0.020 to 0.030 inches provides an indication of good structural integrity of the particular length of culm. An average small cell width of 0.030 inches or greater provides an indication of poor structural integrity for the particular length of culm. Other scales for determining adequate cell sizes are possible.

Referring again to FIG. 9, once cell counts, sizes and/or densities of the culm lengths are particularly noted, the culm lengths may then be split into strips 166 of appropriate width for tip 102 and butt 104 sections (operation 9004). Various types of tools may be used to split or cut the culm 130 into strips 166. For example, a radial splitting tool 172 can be used to split a culm length, as shown in FIG. 11. The radial splitting tool 172 shown in FIG. 11 includes a plurality of equally spaced blades 174 extending outwardly from a central ring portion 176. The ring portion is moved through the hollow center of the culm 130, which causes the blades 174 to split the outer wall 132 of the culm into strips 166 having similarly dimensioned widths.

Once the lengths of culm 130 have been split into strips 166, the sweeps 156 and nodes 154 may require vertical realignment to create a smooth and straight outer surface. Realigning the nodes with the sweeps may be performed by heating the strip with a burner and flattening the strip at the node (operation 9005 of FIG. 9). FIGS. 12A-12C illustrate an example of a lever operated bending tool 174 designed for this task. As shown in FIG. 12A, the bending tool 174 includes a base having 176 two flat support blocks 178 separated by a gap 180. A lever 182 pivotally connected with the base 176 is configured to pivot between the support blocks 178. A strip 166 may be placed on two support blocks 178 with the node 154 positioned over the gap 180. The lever 182 is moved into a position to engage the strip at the node. Force applied to the lever in the direction indicated by the arrows (shown in FIGS. 12A and 12C) acts to straighten the strip 166 and vertically align the node 154 with the sweeps 156. The external surfaces of the individual strips may then be lightly sanded and smoothed across the tops of the nodes. In other embodiments of the present invention, the internal bumps at the nodes may be removed by sanding alone, without bending the strip. As previously mentioned, the strips may be then be rough-cut to a desired thickness (operation 9006), such as 0.100 inches.

As discussed above with reference to FIG. 9, each rough-cut strip may be acoustically profiled (operation 9007) before further processing. By detecting the presence of sound voids (i.e. locations in the strip where sound is not well transmitted) in the strips, acoustic profiling helps to ensure, measure, or grade optimal cell density and structure as well as providing data to help a rod builder match pieces of the rod that are to be assembled. As previously mentioned, lengths of bamboo, strips of culm, unfinished or finished splines, and assembled bamboo rod blanks can be assessed for their ability to transmit sound. As such, the present invention is not limited to performing acoustic profiling on only the rough cut strips. Therefore, acoustic profiling and matching techniques can be applied at any stage of rod construction from the raw culm to the completely finished rod.

FIGS. 13A and 13B illustrate cross sections of two six-sided rod blanks (184, 184') having different cell structures and densities. The cell structure 186 shown in FIG. 13A is more densely packed than the cell structure 188 of FIG. 13B. The more dense cell structure 186 shown in FIG. 13A is evidenced by larger cells 190 and less pith 130, and the less dense cell structure 188 shown in FIG. 13B is evidenced by the smaller cells 192 and more pith 130. Also, as shown in FIGS. 13A and 13B, the inner surfaces of the splines are coated with a layer of stiffener 162, which is discussed in more detail below. Acoustic profiling performed on the rod blanks (184, 184') shown in FIGS. 13A and 13B may be used to provide a rod builder with data that would assist the rod builder in deciding how best to utilize the rod blanks, if at all. For example, acoustic testing may provide a rod builder with data to help him or her to make determinations regarding the stiffness and speed of the rod blanks. In turn, the rod builder can decide whether the rod blanks are suitable for a longer rod, a shorter rod, or not suitable to be turned into a finished product. The acoustic profiling techniques discussed below can also be used to compare rods from other manufacturers that are composed of the same or different synthetic or natural materials.

As discussed in more detail below, data may be produced, analyzed, and recorded from acoustic profiling performed on test subjects in the form of frequency bands displayed on sonograms. When subjected to duplicate testing methods and parameters, more densely packed cell structures in a test subject may be evidenced by higher frequencies displayed on a sonogram, whereas less densely packed cell structures may be evidenced by lower frequencies displayed on a sonogram. For example, the cell structure 186 of the rod blank 184 shown in FIG. 13A is more densely packed than the cell structure 188 of the rod blank 184' shown in FIG. 13B. As such, one may anticipate that the rod blank 184 shown in FIG. 13A would yield higher frequencies on a sonogram than would the rod blank 184' shown in FIG. 13B, provided the rod blanks are similarly dimensioned. This in turn, may provide a rod builder with indications on how best to utilize the rod blanks. For example, the rod blank shown in FIG. 13A may be better suited for use in a longer fishing rod, whereas the rod blank shown in FIG. 13B may be better suited for use in a shorter fishing rod.

Figure 14:
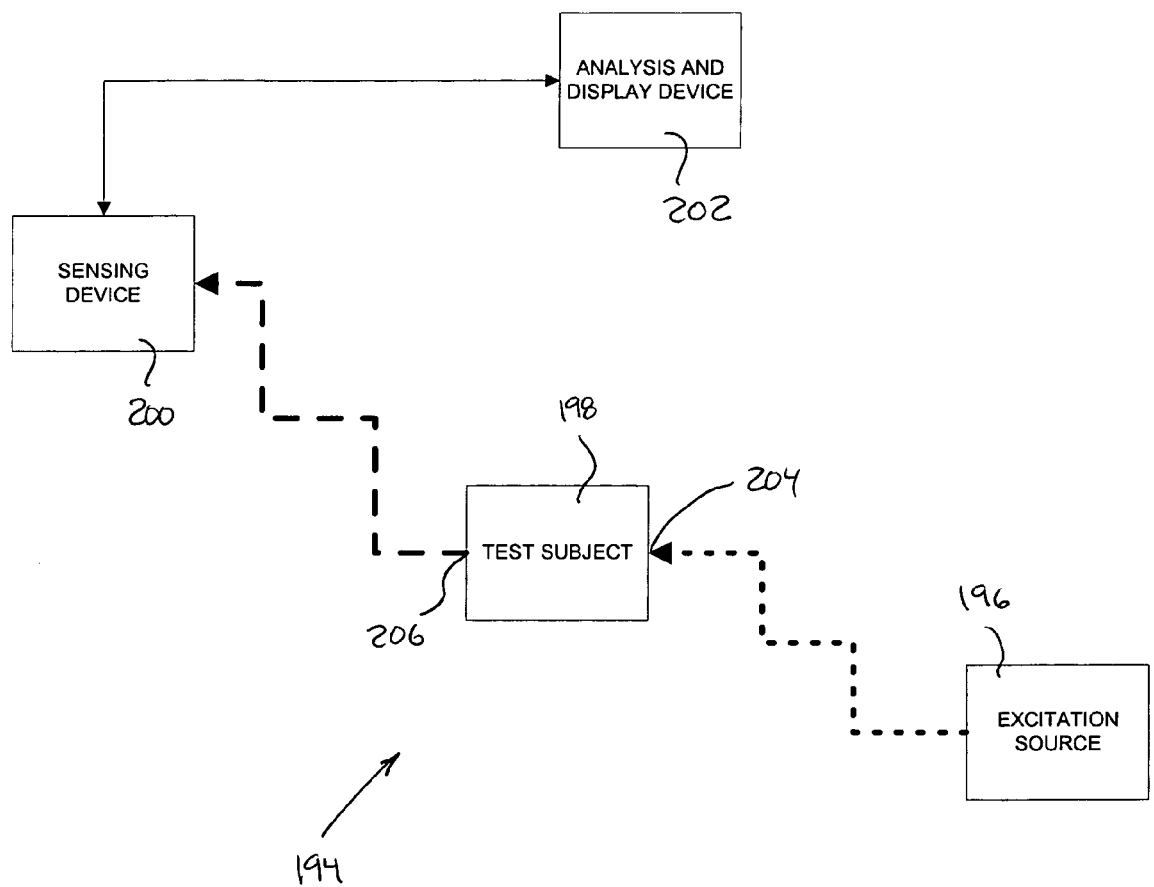
FIG. 14 is a schematic representation of an acoustic test arrangement according to the present invention.

An acoustic profiling test arrangement 194 according to the present invention is shown in FIG. 14. The acoustic profiling test arrangement includes an excitation source 196, a test subject 198, a sensing device 200, and an analysis and display device 202. When conducting an acoustic profiling test of the test subject 198, the excitation source 196 introduces sound and/or vibration into the test subject at a first point on the test subject. It is to be appreciated that acoustic profiling may be applied to various test subjects, such as a rod blank, spline, strip, or culm. Sound passing through the test subject and exiting from the test subject is measured at a second point 206 by a sensing device 200. In some embodiments of the present invention, the sensing device is a microphone. The sensing device 200 is operably connected with the analysis and display device 202, such as an oscilloscope that may also include recording capabilities. The analysis and display device may also provide a real time trace of the acoustic spectrum of the test subject. As such, comparison of individual components or completed products built of the same or different materials may be performed. This allows selection of components; removal and substitution of identified faulty components; changing, improving, modifying, or customizing the components; and adjustment of manufacturing techniques. It is to be appreciated that the first and second points can be end to end or located on any portion of the test subject. In addition, the first and second points can be located in areas of the test subject other than along the length, such as radially.

Various tools and equipment may be used to perform acoustic profiling of test subjects according the present invention. For example, a first test arrangement 194 according the present invention is shown in FIG. 15, which may be referred to as an impact test arrangement. The excitation source 196 utilized in the impact test arrangement 194 is a standardized, measured impact 196' at one end of the test subject. As such, sound is generated by the measured impact at one end of the test subject, which is depicted in FIG. 15 as a strip 166 of bamboo culm. Sound is generated in the test subject 198' by dropping the test subject from a calibrated distance onto an impact surface 206, which is illustrated as a fixed block of material 208. Various types of material may be used to construct the impact surface. For example, one embodiment of the invention utilizes a titanium block. As shown in FIG. 15, a ring 210 secured to a wall or some fixed object is adapted to slidably receive the test subject 198' in order to maintain the test subject in a vertical position relative to the impact surface 206 while at the same time not overly damping sound passing through the test subject.

After being dropped from a known height and impacting the impact surface 206, the test subject 198' bounces upward from the impact surface. The height from which the test subject is dropped affects the signal strength of the sound to be recorded, but does not affect the sound frequencies recorded for a particular test subject. For example, the frequency data recorded from a rod blank dropped from a height of 6 inches will be nearly identical to the frequency data recorded when the same rod blank is dropped from a height of 12 inches. The sensing device 200, which is shown in FIG. 15 as a microphone 200', may receive the sound transmitted from the test subject 198' after the test subject has bounced upward from the impact surface. The microphone 200' delivers received sound information to the analysis and display device. The analysis and display device may in turn provide a real time trace of the acoustic spectrum to the rod builder.

It is to be appreciated that the impact test arrangement may utilize other methods and equipment to initiate sound in the test subject through an impact. For example, in one embodiment of the present invention, sound (vibration) is generated in the test subject by dropping a weight onto the test subject. In yet another embodiment of the present invention, a pendulum having a weight is swung from a height and allowed to impact the test subject. A microphone may also be located close to the opposite end of the test subject to detect the sound output.

A second acoustic profiling test arrangement 194" is shown in FIG. 16, which may be referred to as an acoustic source excitement test arrangement. The excitation source utilized in the acoustic source excitement test arrangement is a speaker device 196" coupled with a first end portion 212 of the test subject 198'. Sound of known or measured specific frequency or spectra is driven into the test subject by coupling the electromagnetic driver of the speaker to the test subject itself, which incorporates the test subject as an integral part of the speaker. For example, in one embodiment of the present invention, sound at varying frequencies from 50 Hz to 20,000 Hz is introduced into the test subject. It is also to be appreciated that the speaker need not be connected directly with the test subject. For example, the speaker may be strategically placed in proximity of the test subject. The sensing device 200, which is shown in FIG. 16 as a microphone 200' located close to a second end portion 214 of the test subject opposite the speaker, may receive the sound transmitted from the test subject 198'. To help ensure the sensing device captures only sound emanating from the test subject as opposed to sound generated by the speaker that passes through the air, the speaker 196" is placed in a sound chamber 216 that prevents sound generated by the speaker that passes through the air to be detected by the sensing device. More particularly, the sound chamber shown in FIG. 16 includes a wall 218 having a hole 220 passing therethrough that is adapted to receive the test subject. The wall 218 is constructed from a material, such as acoustic foam, that absorbs sound generated by the speaker 196" passing through the air and prevents detection by the sensing device 200, while at the same time not overly damping the vibrations of the test subject. Other means may be utilized to prevent sensing device from detecting sound generated by the speaker. For example, the test subject may be excited in a vacuum chamber.

Figure 17A:
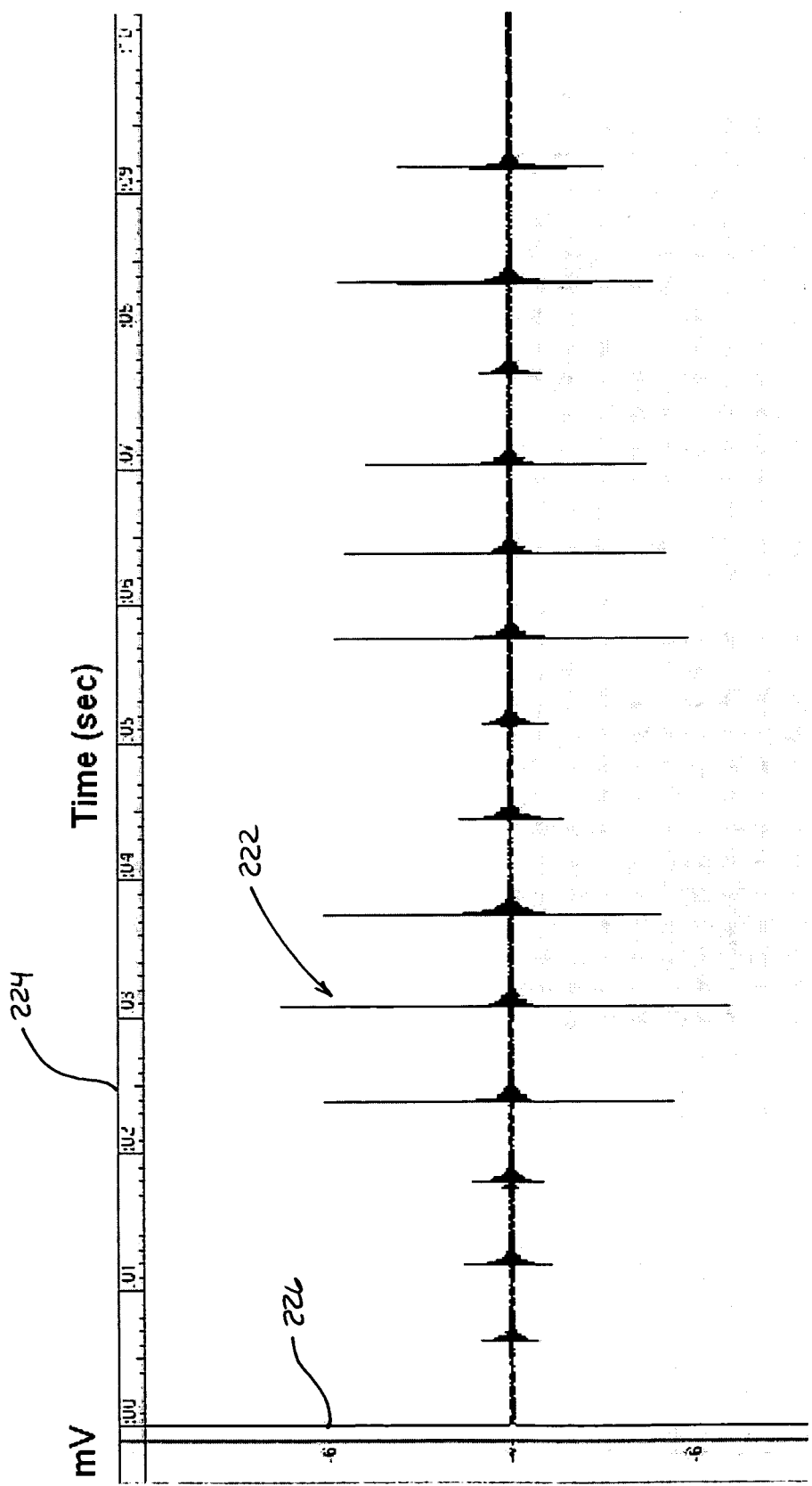
FIGS. 17A-17E illustrate example test results showing recorded sound data from an impact test performed on a butt section of a bamboo rod blank displayed on an oscilloscope and a sonogram.
Figure 17B:
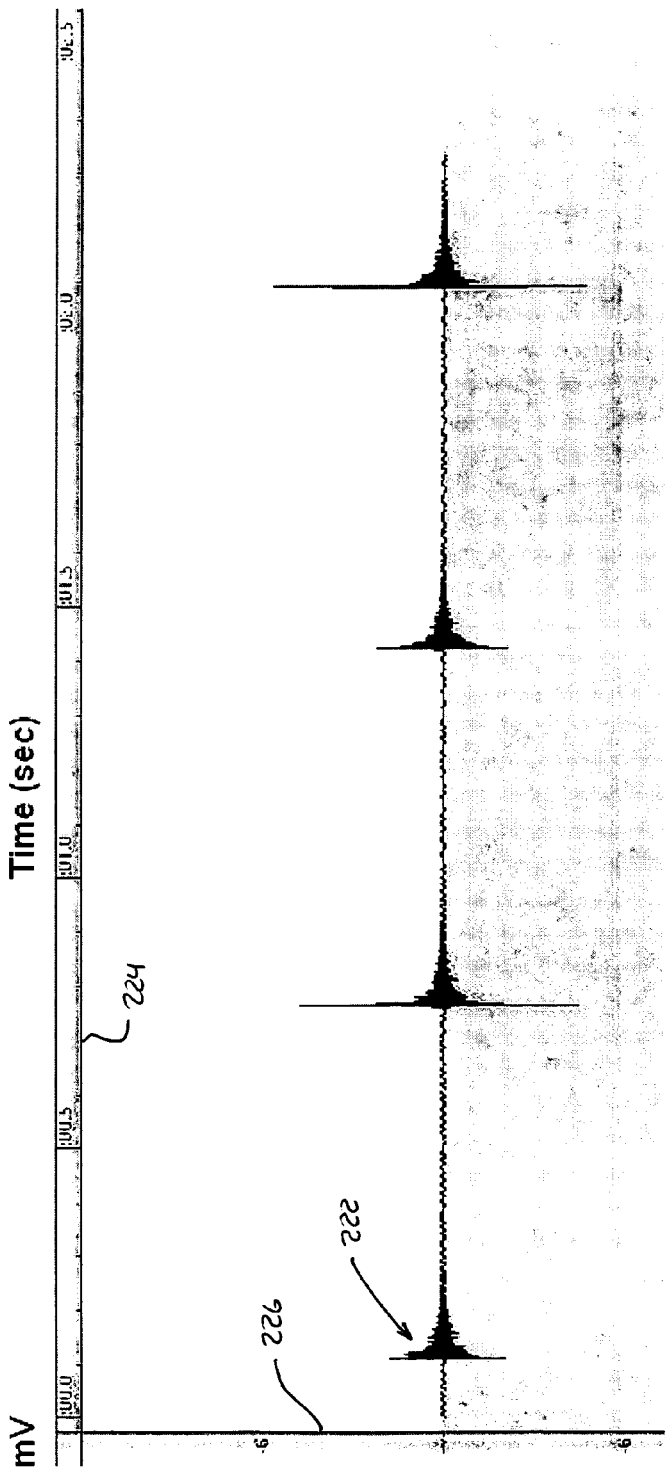
Figure 17C:
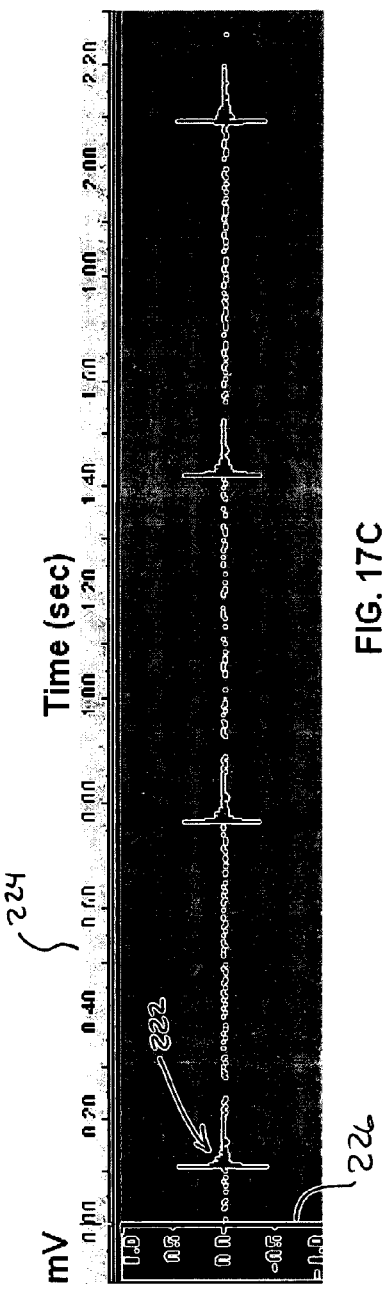
Figure 17D:
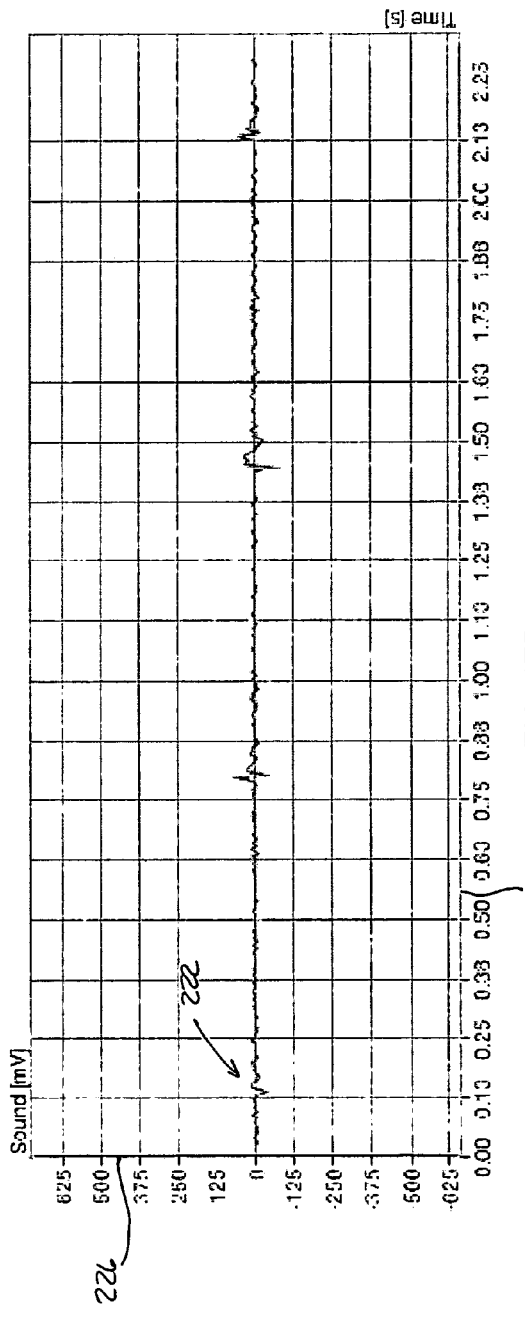
Figure 17E:
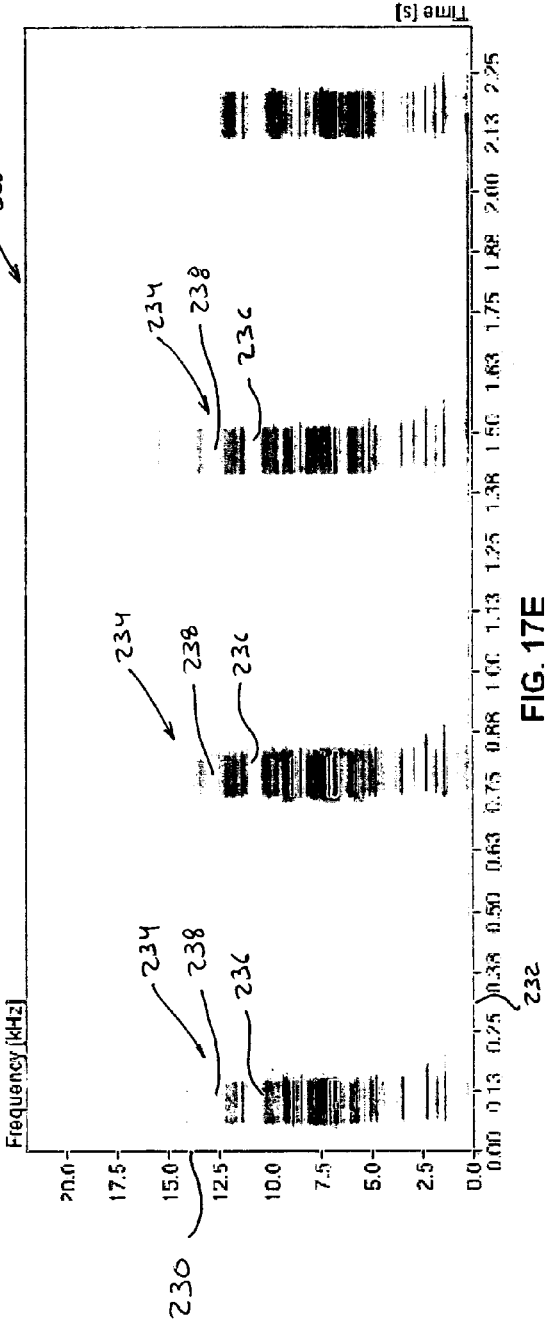

Samples of recorded sound data of a butt section of a bamboo rod blank tested with an impact test arrangement 194' are depicted in FIGS. 17A-17E. FIGS. 17A-17D illustrate sound 222 recorded in the butt section as a function of time, as may be displayed on an oscilliscope. A X-axis 224 represents time in seconds and a Y-axis 226 represents the signal strength and signal frequencies of the recorded sound emanating from the test subject. FIGS. 17A-17D display the same data with different scaling applied to the X-axis 224. Once sound data is recorded on as a function of time, it may be converted to a sonogram for evaluation by the rod builder. For example, FIG. 17E is a sonogram 228 of the sound wave 222 recorded in FIGS. 17A-17D. A Y-axis 230 in FIG. 17E represents frequency in kHz and a X-axis 232 represents time in seconds. As shown in FIG. 17E, sound at various frequencies, which is represented by bands 234 formed by a plurality of horizontal darkened lines 236 extending upwardly from the X-axis 232, emanate from the test butt section of the rod blank as a result of an impact on the butt section. Dead spots 238, represented by gaps in the bands 234 where very lightly shaded or completely missing horizontal lines 236 are located, are indicative of sound frequencies that do not pass through or are absorbed by the test subject. Relatively higher frequencies with few dead spots may be indicative of bamboo having more densely packed cell structures. Relatively lower frequencies with larger or more widely spaced dead spots may be indicative of bamboo having less densely packed cell structures. For example, frequencies that peak at 15 to 15.5 kHz may be indicative a better quality cane cell structure, and frequencies that peak at 12 kHz or less may be indicative of a poor quality cane cell structure. A relatively high number of dead spots may be indicative of a less dense cell structure or weakened areas in the bamboo.

Figure 18A:
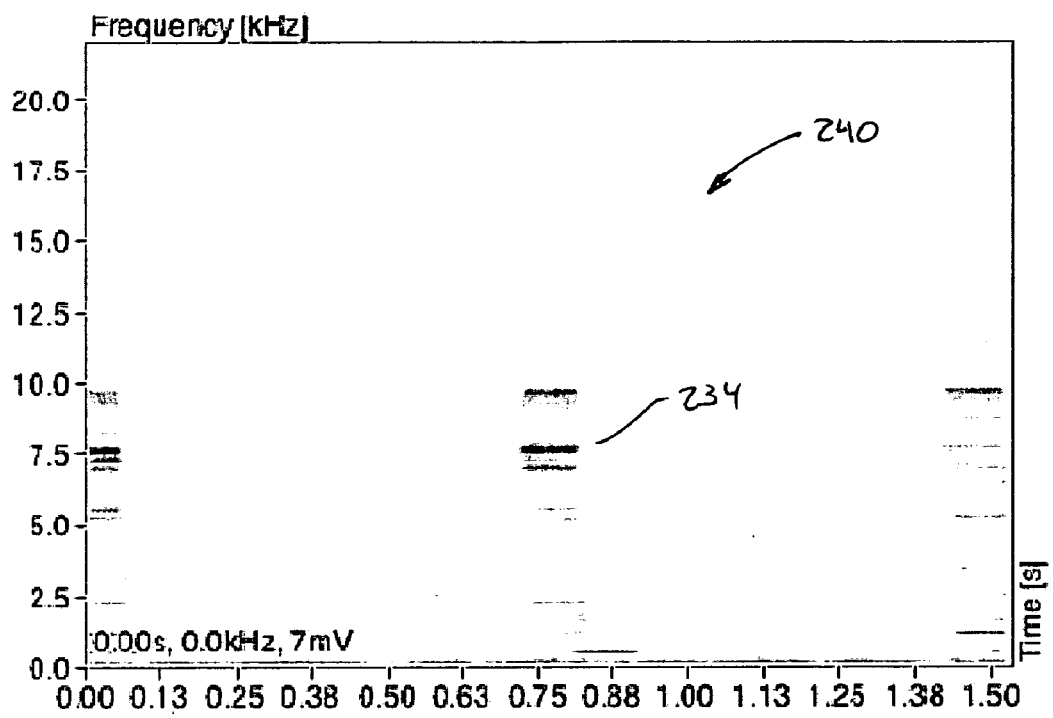
FIG. 18A illustrates a sonogram showing recorded sound data from an impact test performed on a butt end of a butt section of a first rod blank having a first cell structure.
Figure 18B:
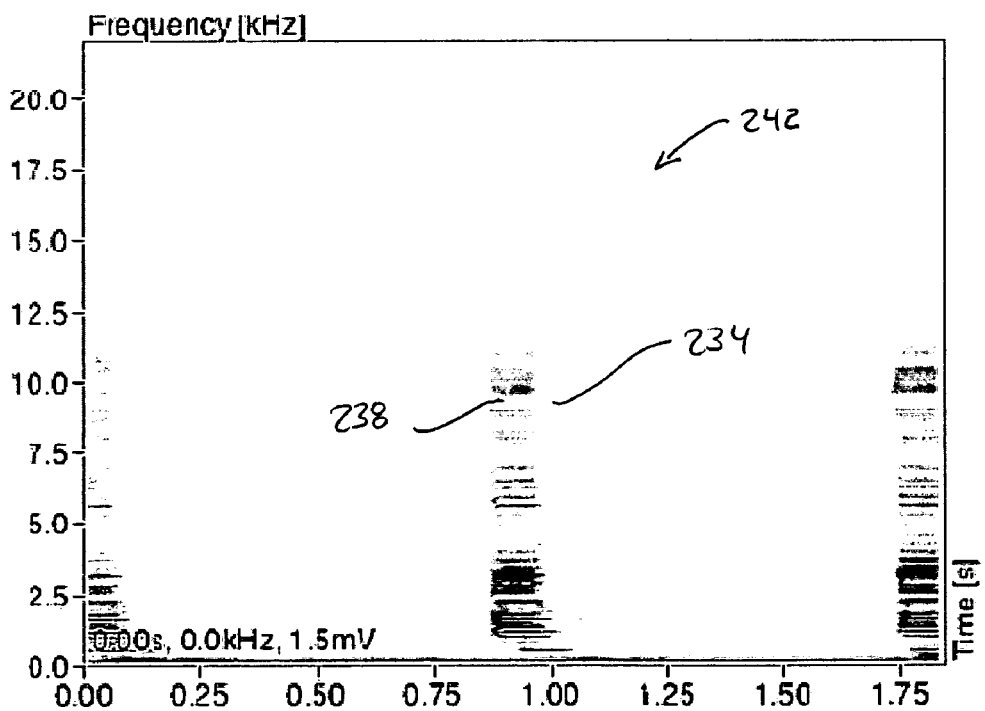
FIG. 18B illustrates a sonogram showing recorded sound data from an impact test performed on a ferrule end of the butt section of the first rod blank having the first cell structure.
Figure 18C:
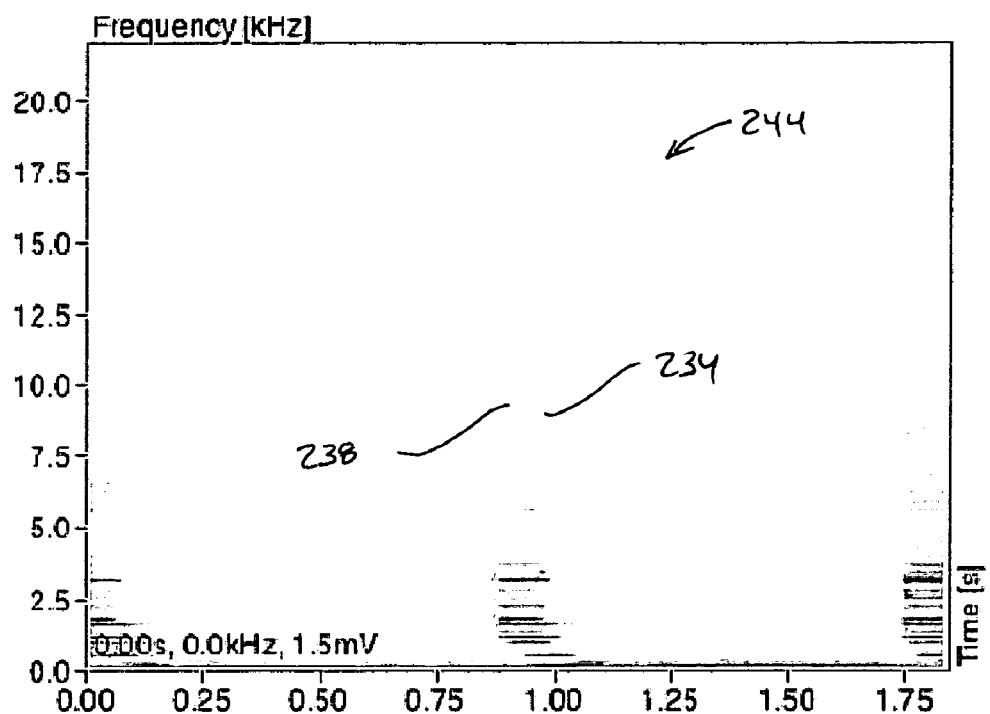
FIG. 18C illustrates a sonogram showing recorded sound data from an impact test performed on a ferrule end of a tip section of the first rod blank having a first cell structure.
Figure 18D:
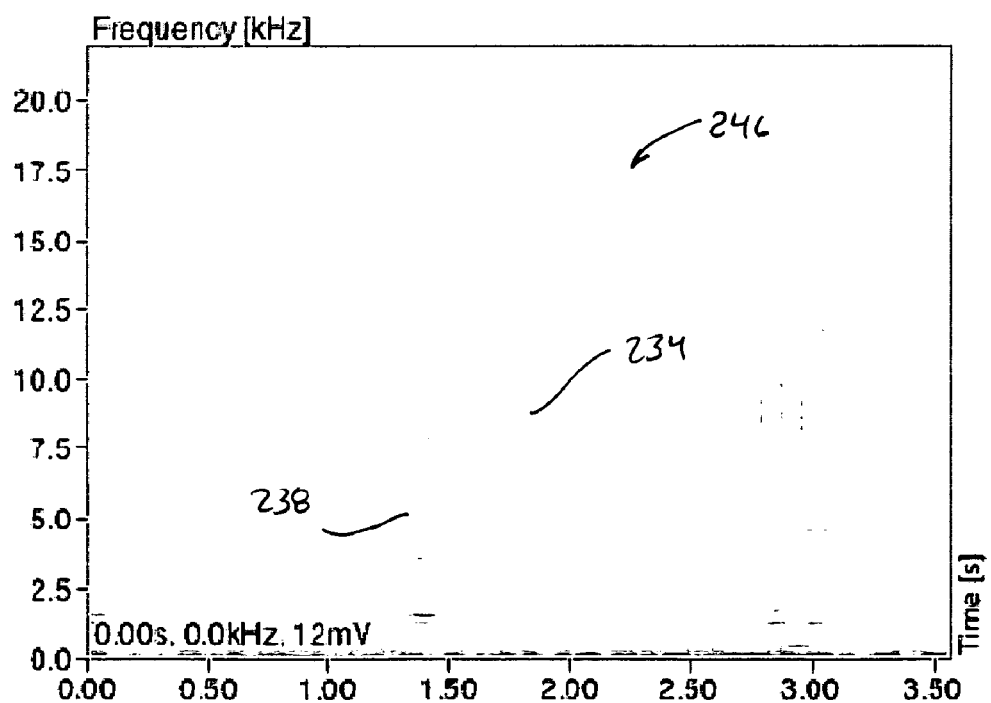
FIG. 18D illustrates a sonogram showing recorded sound data from an impact test performed on a tip end of the tip section of the first rod blank having the first cell structure.
Figure 19A:
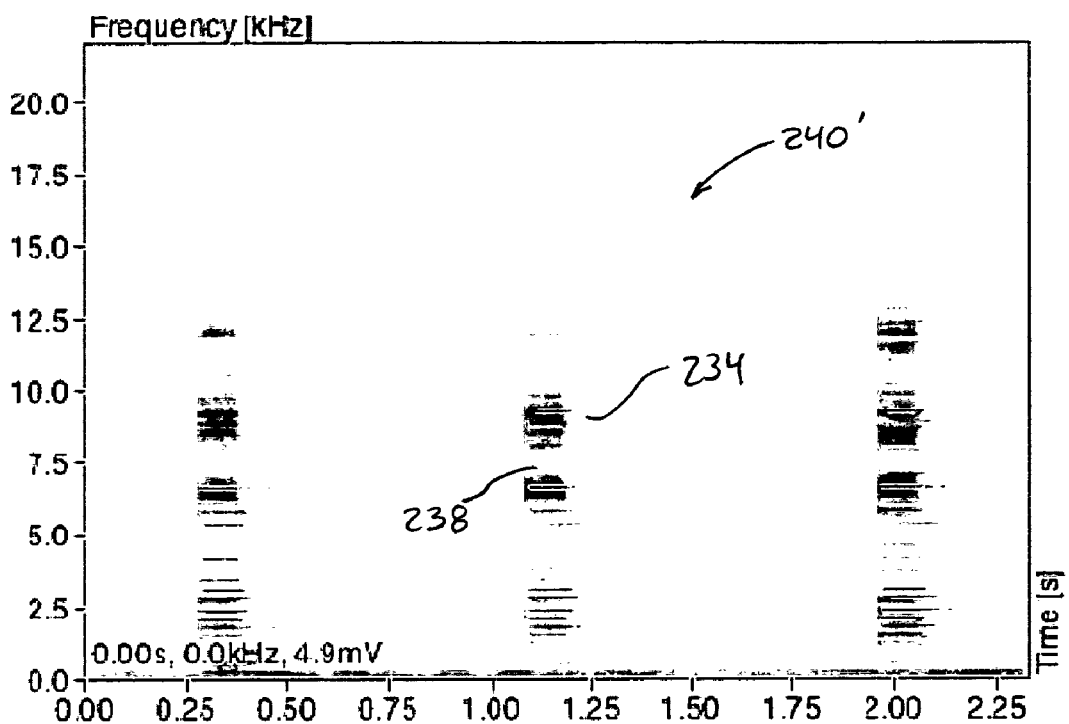
FIG. 19A illustrates a sonogram showing recorded sound data from an impact test performed on the butt end of a butt section of a second rod blank having a second cell structure.
Figure 19B:
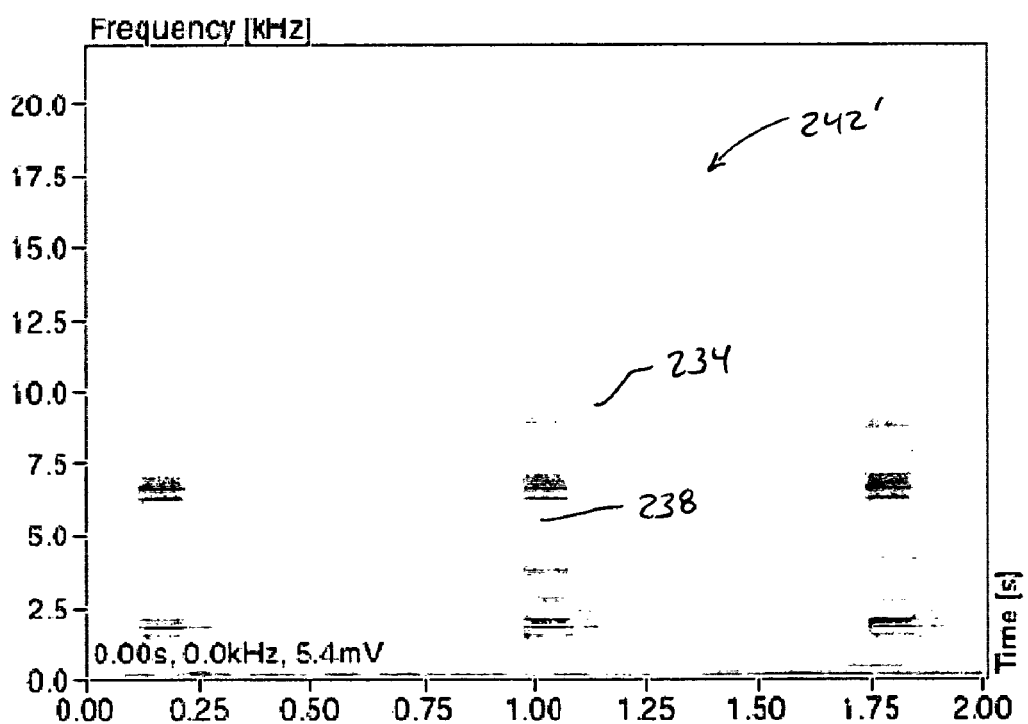
FIG. 19B illustrates a sonogram showing recorded sound data from an impact test performed on the ferrule end of the butt section of the second rod blank having the second cell structure.
Figure 19C:
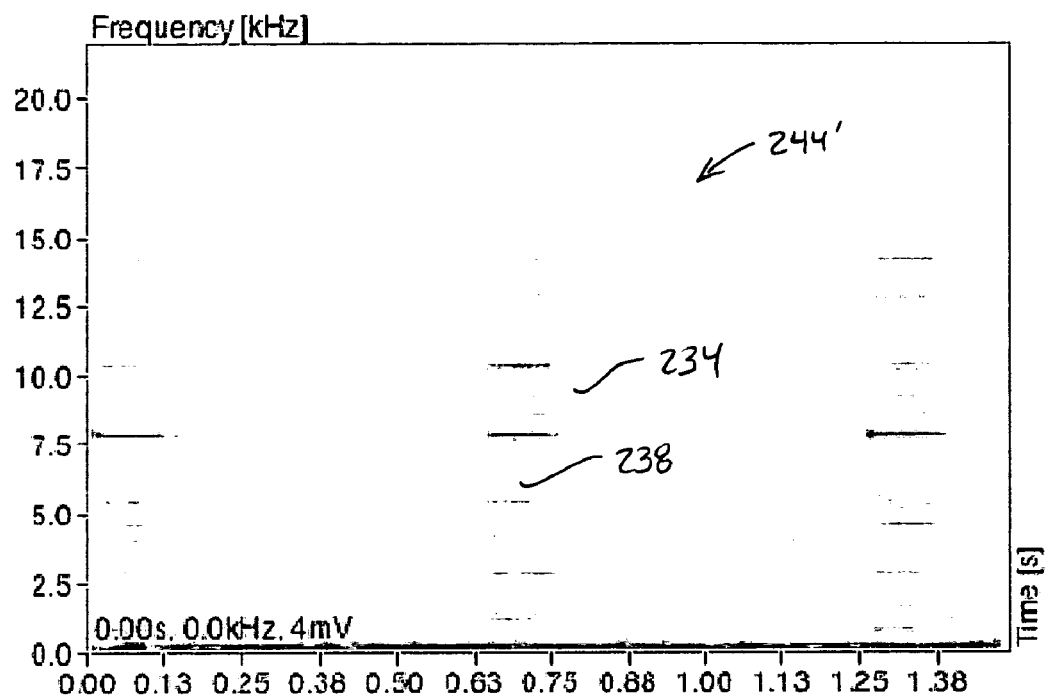
FIG. 19C illustrates a sonogram showing recorded sound data from an impact test performed on the ferrule end of a tip section of the second rod blank having a second cell structure.
Figure 19D:
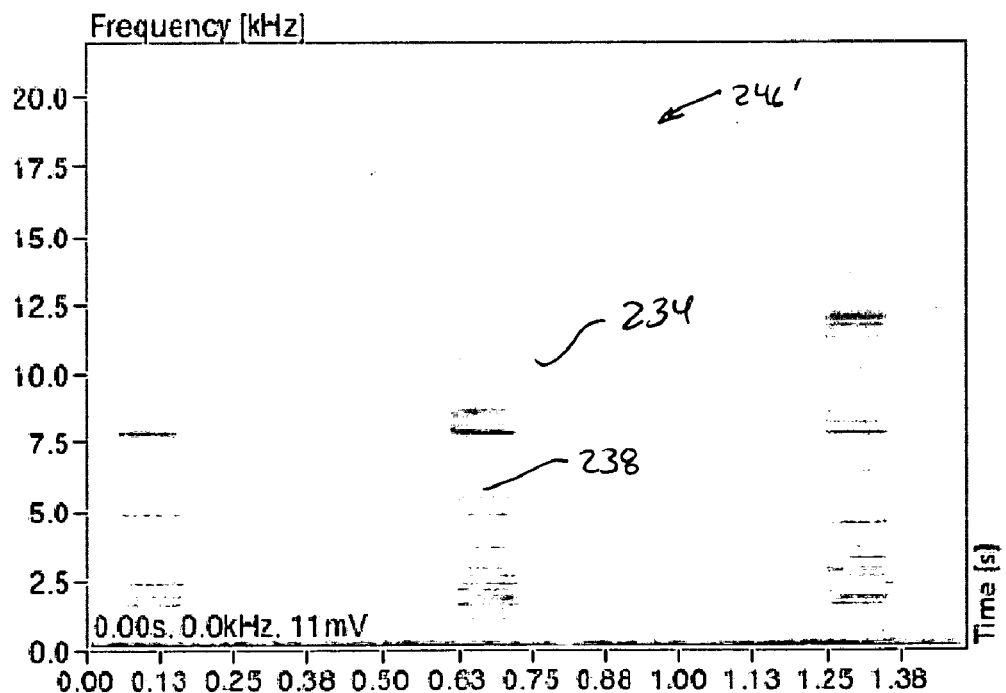
FIG. 19D illustrates a sonogram showing recorded sound data from an impact test performed on the tip end of the tip section of the second rod blank having the second cell structure.
Figure 20A:
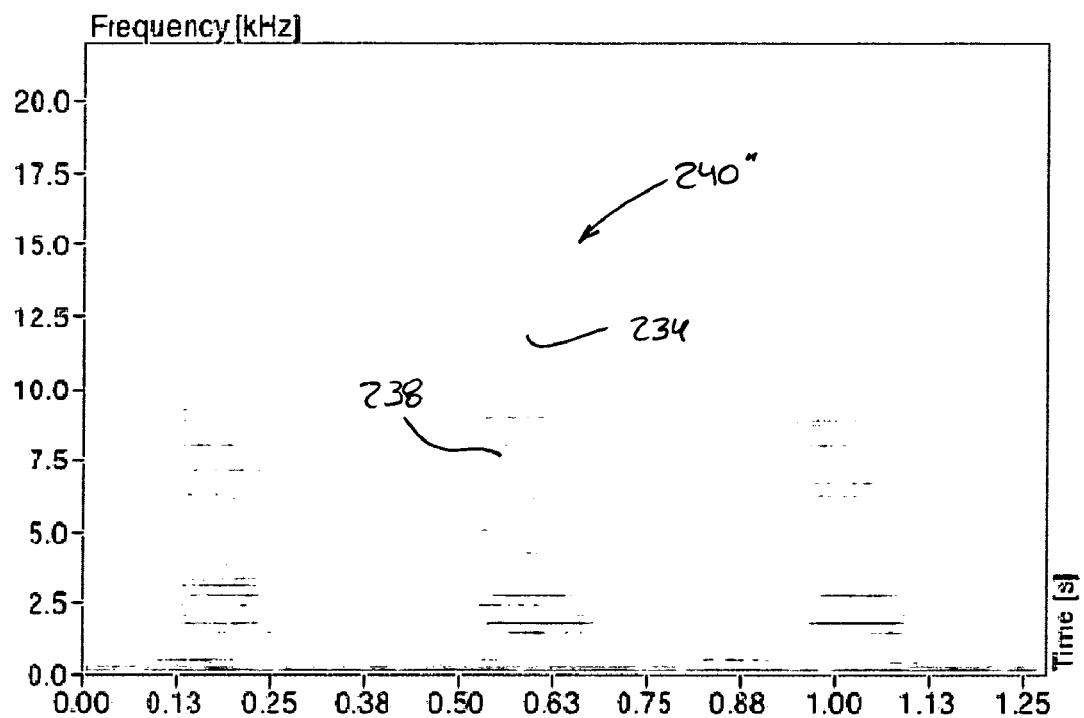
FIG. 20A illustrates a sonogram showing recorded sound data from an impact test performed on the butt end of a butt section of a third rod blank having a third cell structure.
Figure 20B:
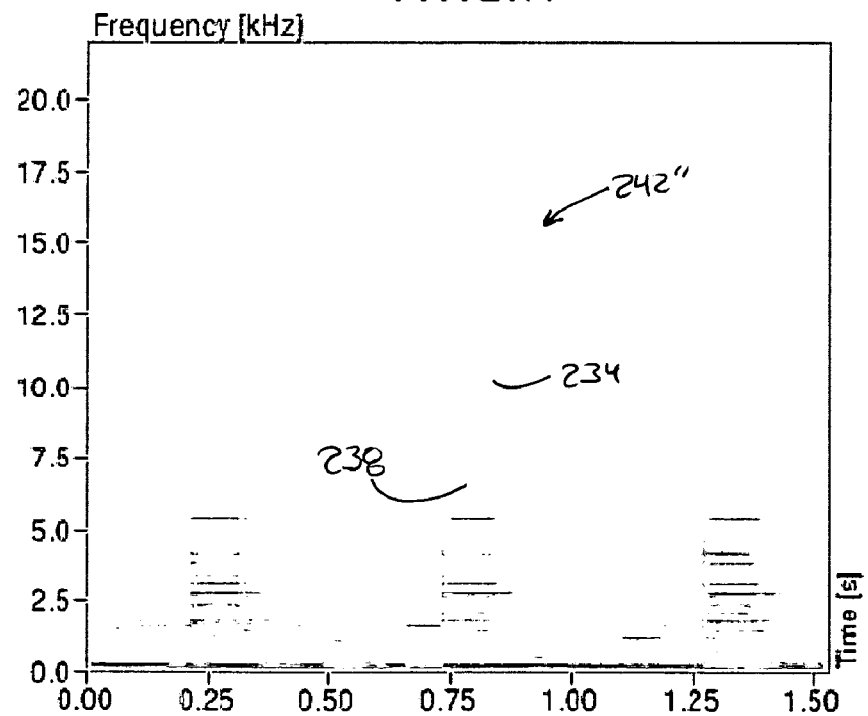
FIG. 20B illustrates a sonogram showing recorded sound data from an impact test performed on the ferrule end of the butt section of the third rod blank having the third cell structure.
Figure 20C:
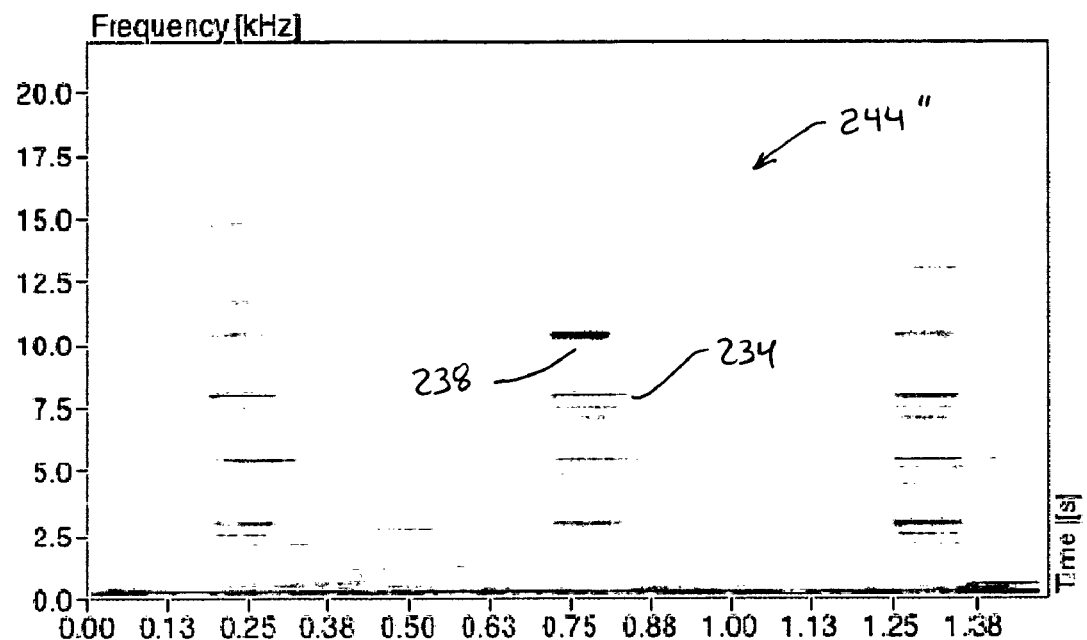
FIG. 20C illustrates a sonogram showing recorded sound data from an impact test performed on the ferrule end of a tip section of the third rod blank having a third cell structure.
Figure 20D:
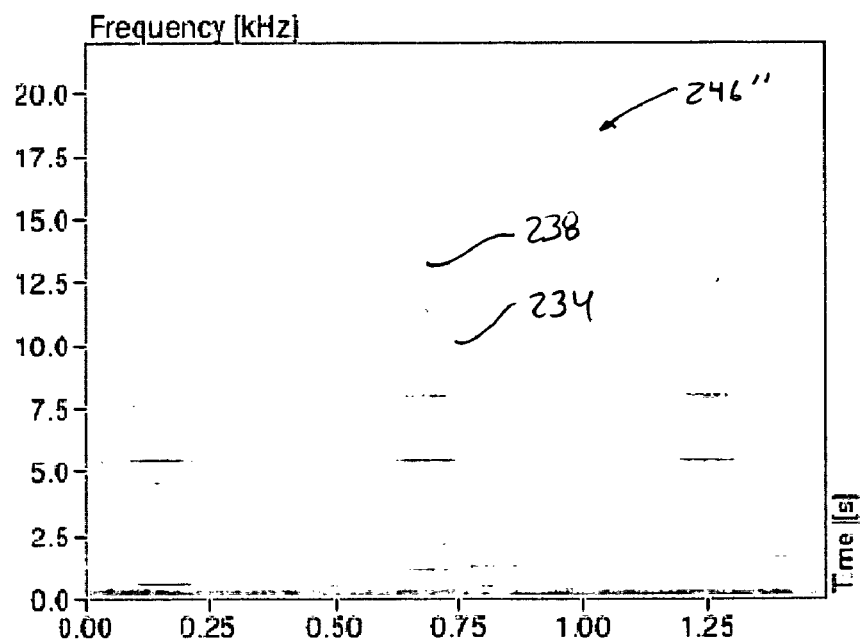
FIG. 20D illustrates a sonogram showing recorded sound data from an impact test performed on the tip end of the tip section of the third rod blank having the third cell structure.
Figure 21:
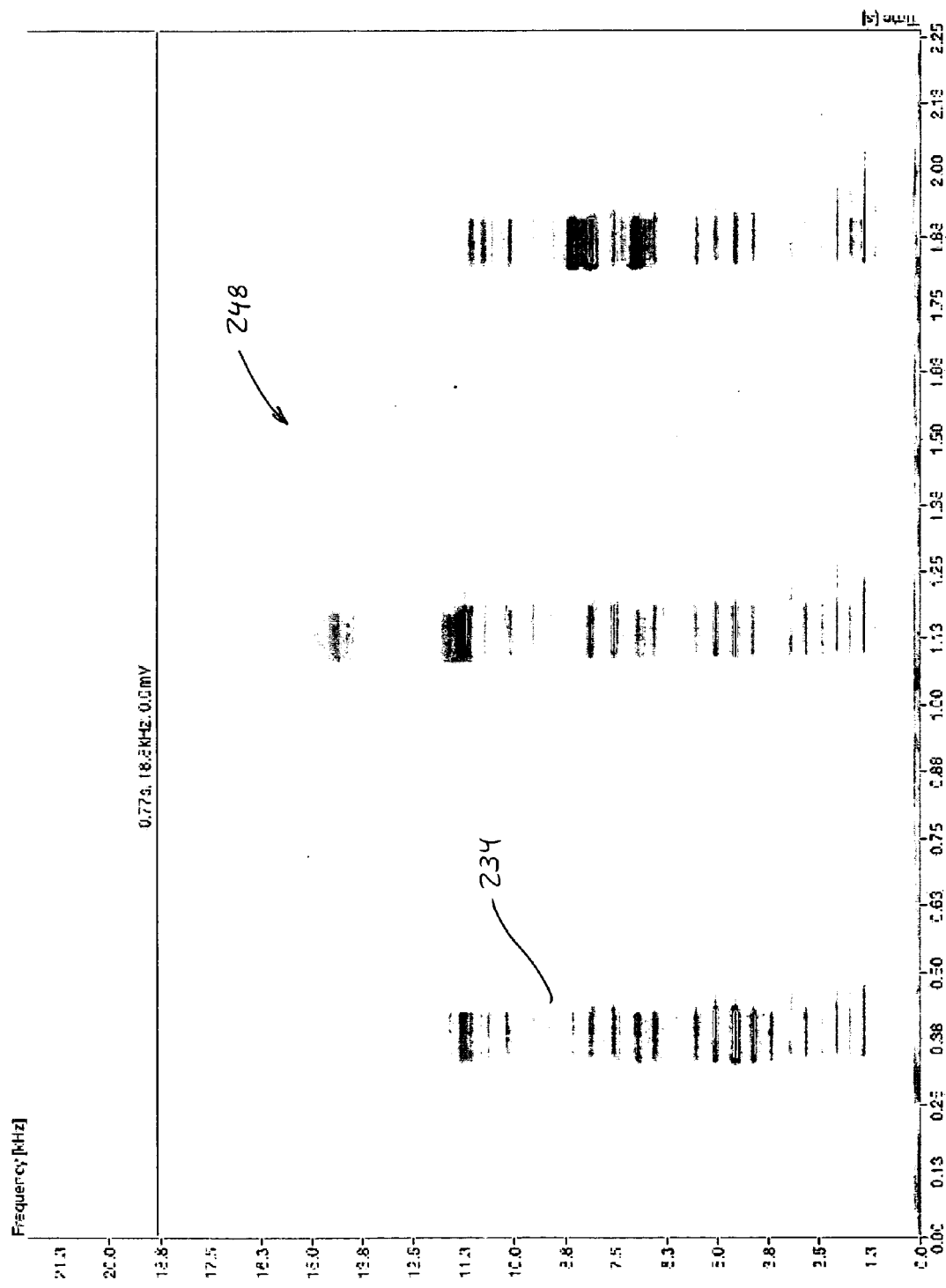
FIG. 21 illustrates a sonogram showing recorded sound data from an impact test performed on the butt end of a butt section made of graphite.

Sample sonograms recorded from impact tests performed on three test subjects, more particularly, butt and tip sections of rod blanks having three different cell structures, are shown in FIGS. 18A-18D, 19A-19D, and 20A-20D. The cell structures represented by the data decrease in density from FIGS. 18A-18D to FIGS. 20A-20D. FIGS. 18A, 19A, and 20A illustrate sonograms (240, 240', 240") recorded by a sensing device placed near the butt ends 122 of the butt sections 104 of the three test subjects, and FIGS. 18B, 19B, and 20B illustrate sonograms (242, 242', 242") recorded by a sensing device placed near the ferrule ends 112 of the butt sections 104 of the three test subjects. FIGS. 18C, 19C, and 20C illustrate sonograms (244, 244', 244") recorded by a sensing device placed near the ferrule 114 ends of the tip sections 102 of the three test subjects, and FIGS. 18D, 19D, and 20D contain data recorded by a sensing device placed near the tip ends 128 of the tip sections 102 of the three test subjects. The frequency bands 234 displayed for the tip and butt sections of all three test subjects peak at approximately 15 kHz, and the frequency bands follow a general trend of becoming less defined as the cell structures in the rod blanks become less dense. For example, a comparison of FIGS. 18C, 19C, and 20C shows how the test data can be used to illustrate the decreasing densities of the cell structures of the different test subjects. For example, frequency bands 234 for the sonogram 244 in FIG. 18C are darker and more well defined than the frequency bands 234 for the sonogram 244' in FIG. 19C. Further, the frequency bands 234 for the sonogram 244' in FIG. 19C are darker and more well defined than the frequency bands 234 for the sonogram 244" in FIG. 20C. In addition, the frequency bands 234 shown in FIG. 18C contain a less number of and narrower dead spots 238 than the frequency bands 234 shown in FIGS. 19C and 20C. As such, this data illustrates that additional frequencies of sounds can pass through the test subject of FIG. 18C than those of FIGS. 19C and 20C, which indicates a cell structure of decreasing density from FIG. 18C to FIG. 20C. For comparison, FIG. 21 shows a sonogram 248 containing frequency data taken from an impact test performed on a butt section of a graphite fishing rod.

Figure 22:
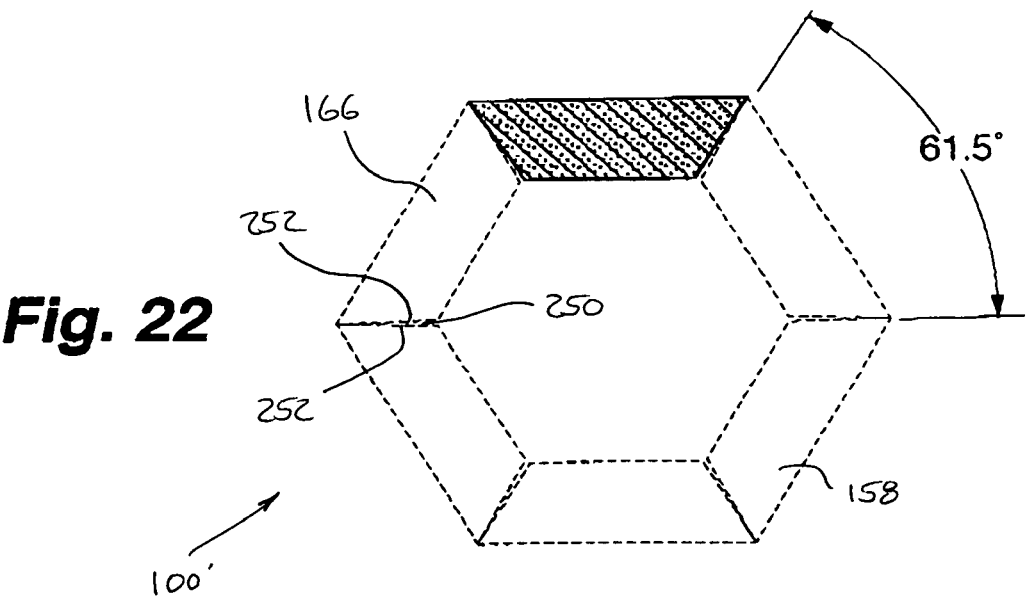
FIG. 22 shows a representative cross section of a six-sided bamboo rod blank having strips with 61.5 degree beveled edges.
Figure 23:
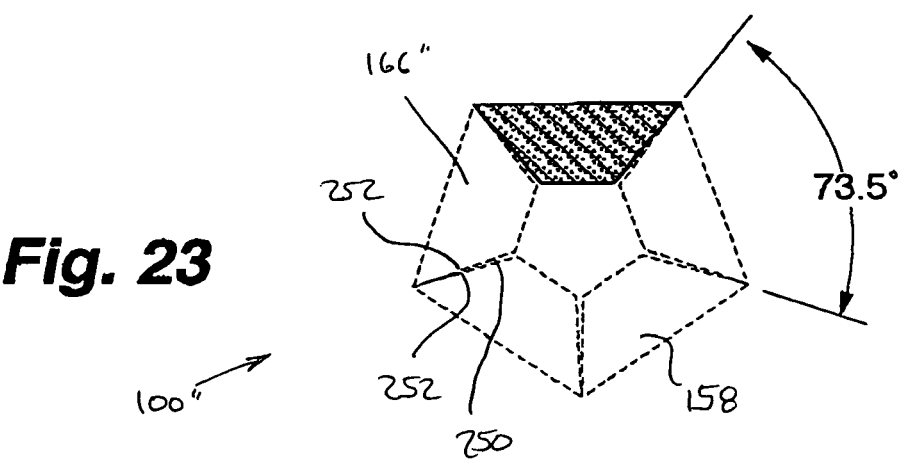
FIG. 23 shows a representative cross section of a five-sided bamboo rod blank having strips with 73.5 degree beveled edges.
Figure 24:
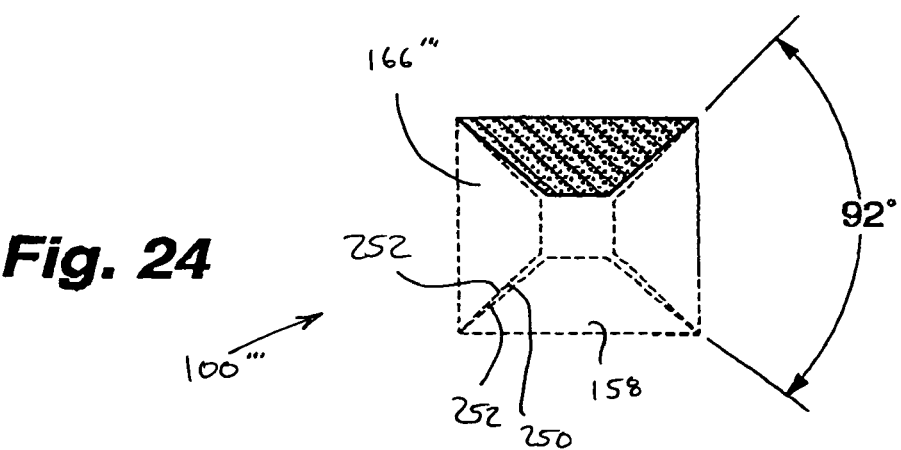
FIG. 24 shows a representative cross section of a four-sided bamboo rod blank having strips with 92 degree beveled edges.

As previously discussed with reference to FIG. 9, once acoustic testing of the strips is completed, the strips 166 may then be cut to an appropriate width (operation 9008), beveled (operation 9009), and tapered (operation 9010) to final dimensions. These operations may be accomplished with a mill or plane. Before cutting the strips, the strips may be steamed to help ensure even moisture content and to allow ease of cutting. In one embodiment of the present invention, the strips are steamed for three hours before cutting. The number of sides to be included on a fishing rod dictates the degree of bevel. For example, as shown in FIG. 22, strips 166' to be used in construction of a six-sided rod 100' may be beveled to 61.5 degrees. Strips 166" used in construction of a five-sided rod 100" may be beveled to 73.5 degrees as shown in FIG. 23, and strips used to construct a four-sided rod may be beveled to 92 degrees. As shown in FIGS. 22-24, the beveled strips may be constructed to form gaps 250 between longitudinal edges 252 of adjacent strips. Adhesive used to glue to the strips together may fill the gaps to provide stronger adhesion between the strips. After completing operation 9010, the cut, beveled, and tapered strips 166 may then be referred to as splines 158 used for construction of the tip and butt sections of the fishing rod.

The flow chart depicted in FIG. 8, which illustrates one method of constructing the tip 102 and butt sections 104 of a bamboo fishing rod 100 from splines 158, may begin by first sanding or cutting the inner wall side of the splines to a final wall thickness 160 (see FIGS. 13A and 13B) (operation 8000). In one embodiment of the present invention, the final wall thickness is 0.040 to 0.080 inches. The wall thickness of the splines may be varied along their lengths depending upon the cane structure and the desired line casting weight, which relates to the designated rod weight.

Figure 25:
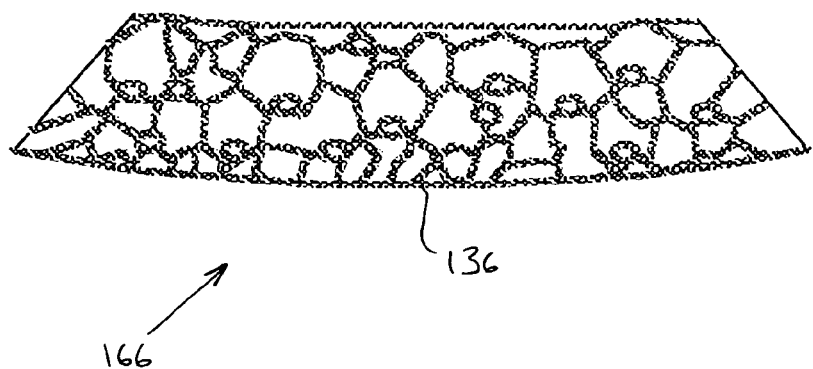
FIG. 25 shows a representative cross section of a non-reinforced spline.
Figure 26:
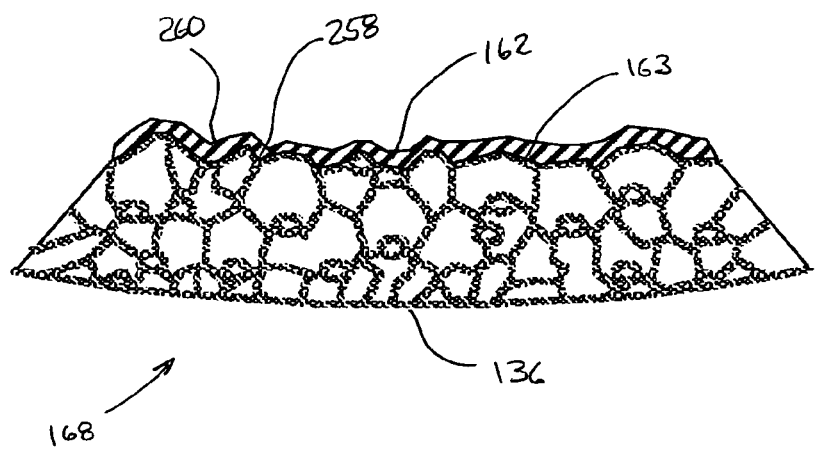
FIG. 26 shows a representative cross section of a micro-rilled spline reinforced with epoxy.
Figure 27:
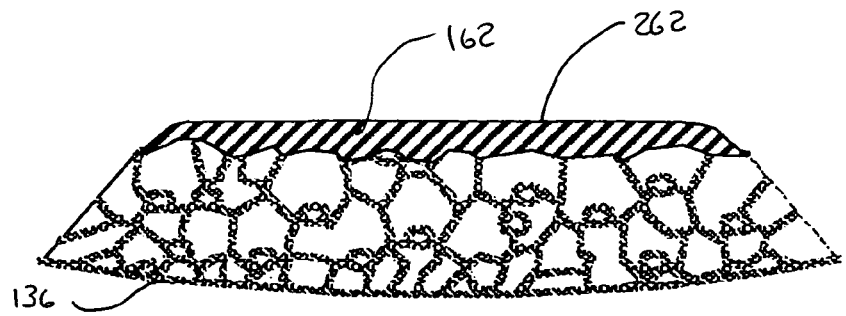
FIG. 27 shows a cross section of a spline reinforced with lateral flat epoxy.

Once cut to a final wall-thickness, the splines 158 may then be wire brushed to remove the pith from between the longitudinal cells and produce a naturally spaced structured rilling of the surface (operation 8002). More particularly, the wire brush is moved in a direction lengthwise along the splines 158. In some embodiments of the present invention, the bristles of the brush are small enough to reach fully between the cell fibers depending upon cell spacing to help ensure a thorough cleaning and micro-rilling along the length of the inner surface. In one embodiment of the present invention, the brush includes bristles having a diameter of 0.004 inches. It is to be appreciated that other tools may be used remove the pith, such as a wire wheel. The micro-rilled reshaping of the inner surface increases surface area and produces a corrugated inner wall 163. FIG. 25 shows a cross section of a spline 166 before micro-rilling, and FIG. 26 shows a cross section of a micro-rilled spline reinforced with a layer of stiffener 162. Micro-rilling achieves a better bond of the stiffener to the exposed cells. By replacing the structurally inert pith with a thin layer of stiffener, which fills grooves 258 left by rilling, the inner wall surface 260 is more closely related to the hard dense fibers of the exterior wall surface 136. When microscopic and acoustic profiling indicate high counts of densely packed fibers, micro-rilling can become unnecessary. As such, a flat inner wall 262 with a coating of stiffener may be used that produces similar reinforcement and stiffening, as shown in FIG. 27.

Once micro-rilling is complete, a coating of stiffener 162 may be applied to the splines 166 (operation 8003 of FIG. 8). In application, the stiffener may be epoxy, which may be chosen to accommodate the requirements of heat, strength, working time, adhesion to the cane, stiffening qualities, and the viscosity of the adhesive. Various epoxies may be utilized with the present invention, such as: (1) Ciba-Geigy TDM 100-1 resin and TDM 100-1 hardener; (2) Ciba-Geigy Araldite AY 557 and HY 991 hardener; and (3) Ciba-Geigy TDR 1100-11 and TDR 1100-11 hardener. In one embodiment of the present invention, the hardener and resin are mixed to a weighed tolerance of 0.01 grams, power mixed for at least 5 minutes at 1200 rpm, and then placed under maximum vacuum while agitating the mixture, to remove gas from the epoxy mixture and eliminate any air bubbles introduced by the mixing process.

Application of stiffener or epoxy which acts to create a double-wall construction (operation 8004 of FIG. 8) and to glue the splines together (operation 8005) may be combined in one process. The term "double-wall" construction refers to a resulting spline configuration having a inner layer of stiffener 162 and the outer wall 132 of the culm 130 made of hard densely packed hard outer cells (146, 148), as described above with respect to FIGS. 5 and 6. Various amounts of stiffener may be applied to the beveled walls and the rilled inner wall surface. For example, in one embodiment of the present invention, between 0.002 to 0.006 inches of epoxy may be applied to coat the rilled inner wall surface and conform to the corrugated or rilled wall. As previously mentioned with reference to FIGS. 22-24, the epoxy may also fill the gaps 250 between adjacent splines 158. The tip and butt sections of a rod may be coated with the same or different epoxy mix or thickness.

Figure 28:
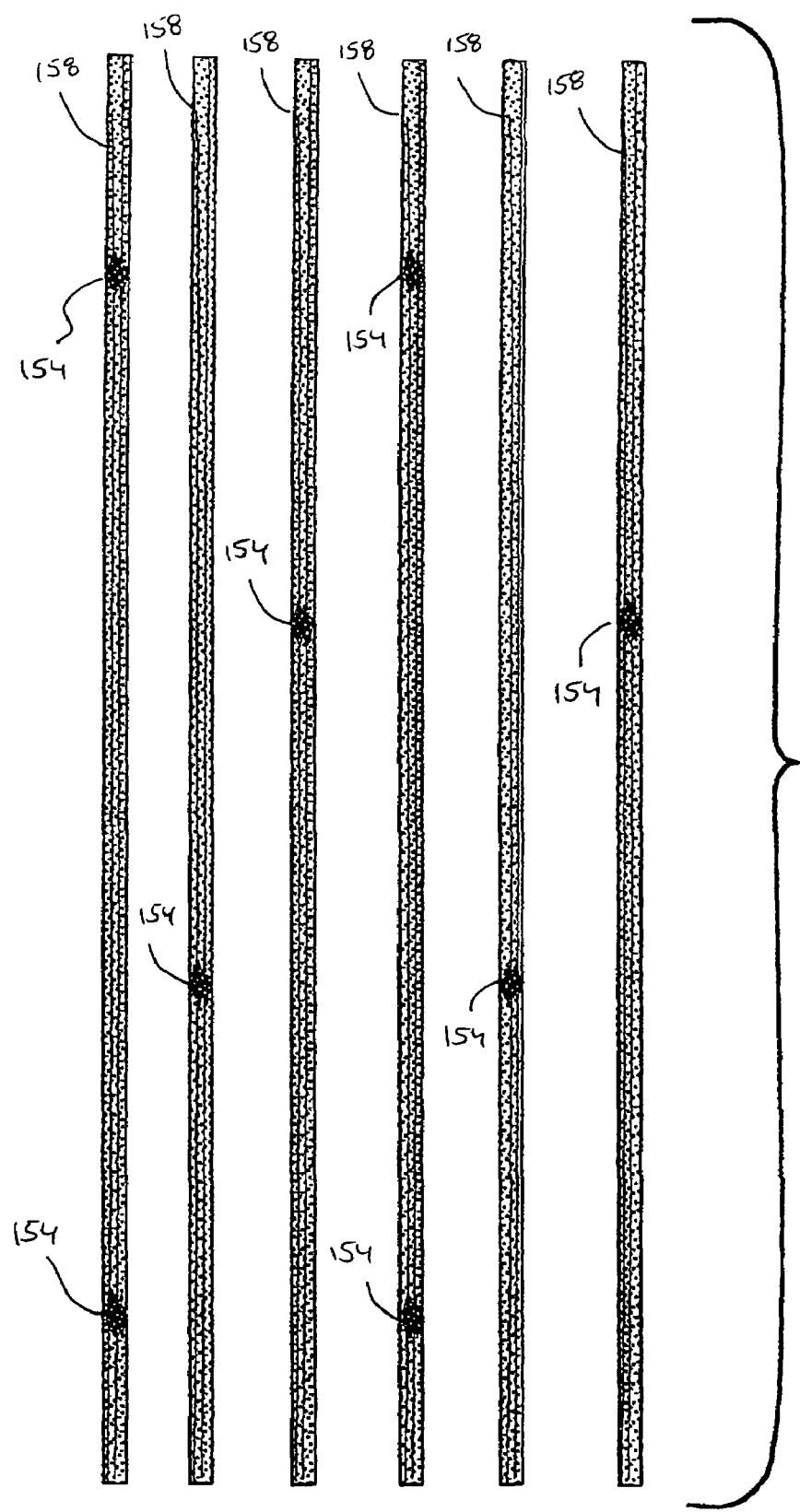
FIG. 28 shows six splines arranged in a 2/2 nodal stagger.

Before assembling the splines together, the splines 158 may be matched for nodal patterns (operation 8003). Sometimes the nodes 154 are matched as evenly as possible or staggered in a regular pattern dictated by the number of sides of the polygon that form the rod. Various types of patterns are possible. For example, with a six-sided rod, three patterns may be used: (1) a two node opposing pattern (i.e., a 2/2); a three node lined up pattern (i.e., a 3/3); and a spiral node stagger pattern. FIG. 28 illustrates splines 158 to be used in a six-sided rod blank laid out with a 2/2 nodal stagger. As such, nodes 154 on every other strip are aligned to oppose each other.

Figure 29:
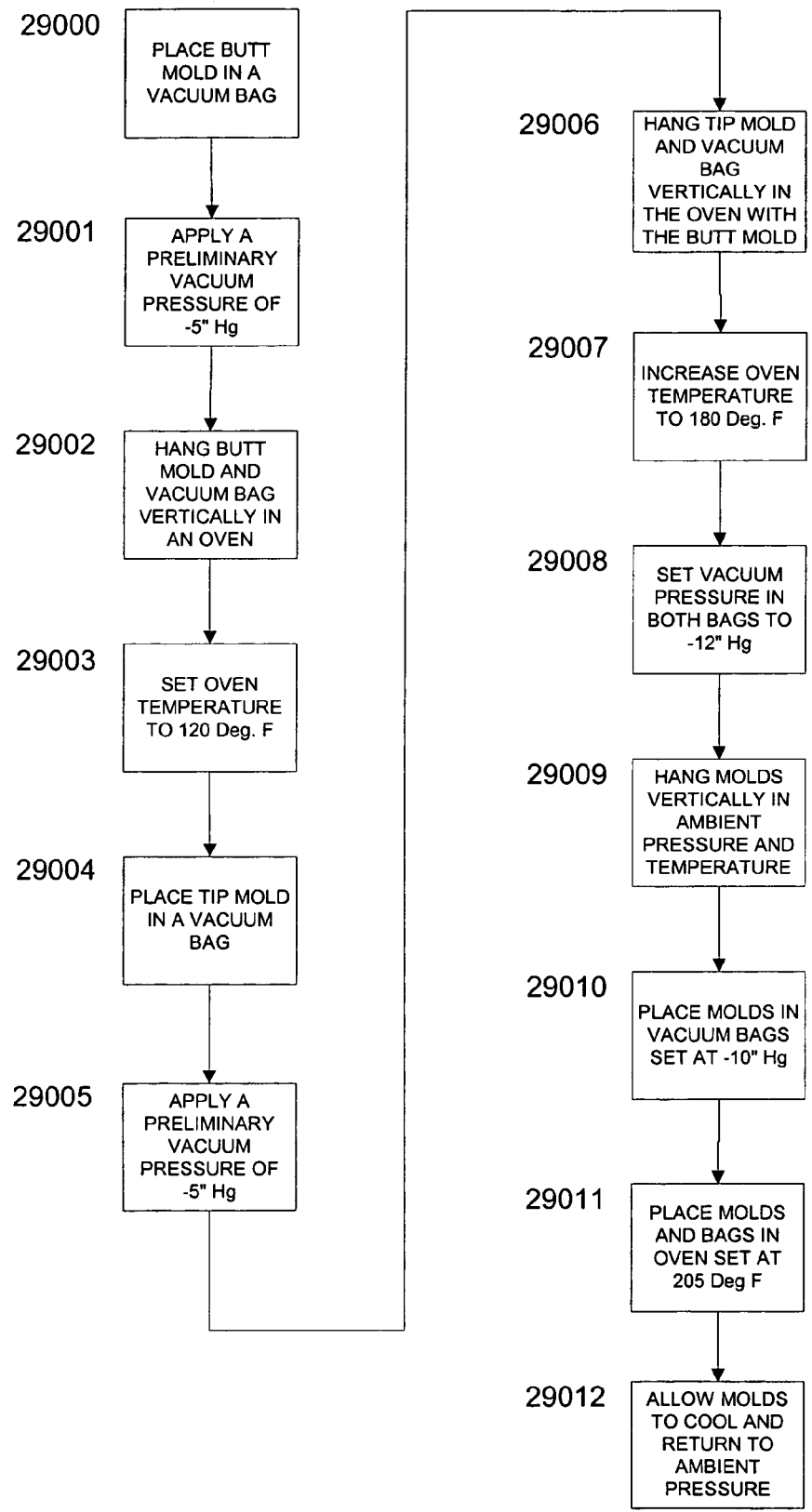
FIG. 29 is a flow chart showing one method for applying heat to rod blanks contained in molds in a vacuum according to the present invention.

In operation 8005 of FIG. 8, each section may be formed into a polygon cross section along their lengths, such as illustrated in FIGS. 13A and 13B, and held with a temporary fixative, such as tape, while introduced into a bamboo-wrapping machine where each section is wrapped in a double helical manner with cotton string. A suitable thinner may be applied to the wrapped sections to remove excess epoxy and allow later removal of the string. The wrapped sections may then be placed in a shimmed aluminum mold that matches the rod taper and is treated with an appropriate release agent. Various types of release agents may be used with the present invention, such as lecithin, wax, and boron nitride. The molds are then placed in a vacuum, exposed to heat and allowed to cool (operations 8007-8008). FIG. 29 shows a particular method for carrying out operations 8007-8008 according to one embodiment of the present invention. The order in which the operations shown in FIG. 29 are performed may vary, and should not be construed to be limited to the order depicted.

As shown in FIG. 29, the butt section is wrapped and placed in a mold, and the mold is placed in a vacuum bag (operation 29000). It may be advantageous to wrap the butt section before the tip section, because more time may be required to heat the increased mass of the butt section, as discussed below. The rod position is checked for straightness and twisting and a preliminary vacuum applied at −5 inches Hg (operation 29001). The bag is sealed after further checks for rod position and twist, and a vacuum of −5 to −10 inches Hg is applied to the mold. The vacuum pressure is dependant upon ambient atmospheric pressure and the wall thickness of the rod blank. The vacuum pressure may be adjusted by means of a selected bleeder valve operably connected with the vacuum bag to minimize polygonal distortion.

The butt mold and section in the vacuum bag are hung vertically in an oven (operation 29002). The oven temperature is set at 120 Deg. F. (degrees Fahrenheit) (operation 29003) with the vacuum pressure maintained in the vacuum bag. The tip section is wrapped and placed in a mold, and the process of placing the tip section in a vacuum bag and the oven is carried out (operations 29004-29006), which is similar to the steps previously performed with respect to the butt section. The oven may then be raised to a temperature of 180 Deg. F. (operation 29007) and the vacuum increased on both the tip section and the butt section to −12 inches Hg (operation 29008). The tip and butt sections may be baked at this temperature and vacuum for 30 minutes, which removes gas and air from the epoxy, and provides for plasticization of the bamboo as well as initial curing/cross-linking of the epoxy.

After 30 minutes of heating in the vacuum, the tip and butt sections and molds are removed from the vacuum bag and allowed to return to ambient room temperature for 24 hours (operation 29009). The sections contained in the molds may be supported vertically in air during this time. After 24 hours, the tip and butt sections contained within their respective molds are returned to their respective vacuum bags, rotated 180 degrees from their previous cure position, and placed vertically in the oven under vacuum at −10 inches Hg (operation 29010). The oven temperature may be raised to 205 Deg. F. (operation 29011) for an hour. This post-cure process intensifies the cross-linking of the epoxy, and the reversal of orientation allows the sections to further straighten with reduced tension, which is initially induced by mold adherence during the first molding. The blanks are then slowly allowed to return to room temperature, without vacuum, in the vertically hung molds (operation 29012). The cotton string wrap is taken off and the enamel surface outer surface of the culm is scraped away. The surface is then sanded to finished quality.

As previously mentioned, the present invention may include a ferrule 106' made of carbon fiber, as shown in FIGS. 30A-33. For example, in one embodiment, the female portion 108' of the ferrule 106' may utilize a triaxial wrap 266 of carbon fiber, and the male portion 110' may utilize a biaxial wrap 268 of carbon fiber. More particularly, the female portion 108' may be wrapped with unidirectional carbon fiber on a mandrel with a 0.0028 inch taper and coated with a biaxial woven wrap of carbon fiber to produce a wall with a similar flexural modulus to that of a hollow bamboo rod blank. The male portion 110' may be wrapped with a biaxially woven carbon fiber adapted to engage the female portion. Various configurations of biaxially wrapped carbon fibers may be used with the present invention. For example, the present invention may utilize a 45 degree biaxial wrap wherein the woven fibers extend in a direction of 45 degrees with respect to the longitudinal axis of the ferrule 106'. The present invention may also utilize a 0-90 degree biaxial wrap wherein the woven fibers extend in directions that are parallel to and orthogonal with the longitudinal axis of the ferrule 106'.

As shown in FIGS. 30A and 30B, the female portion 108' of the ferrule may be connected with the butt section 104 of the rod blank. The female portion 108' may include a hollow cylindrically shaped main body 270 having a first inner wall 272 that defines a first rod section 241 and a first connection section 276. The first rod section 272 is adapted to receive the ferrule end 112 of the butt section 104 of the rod, and the first connection section 276 is adapted to receive the male portion 110' of the ferrule. As assembled, the butt section 104 of the rod is inserted into the first rod section 274 of the female portion 108' of the ferrule until the ferrule end 112 of the butt section 104 abuts the first inner wall 272 of the female portion of the ferrule. As shown in FIGS. 31A and 31B, the male portion 110' of the ferrule may be connected with the tip section 102 of the rod blank. The male portion 110' may include a hollow cylindrically shaped main body 278 having a second inner wall 280 that defines a second rod section 282 and a second connection section 284. The second rod section 282 is adapted to receive the ferrule end 114 of the tip section 102 of the rod, and the second connection section 284 is adapted to be received within the first connection section 276 of the female portion 108' of the ferrule. As assembled, the tip section 102 of the rod is inserted into the second rod section 282 of the male portion 110' of the ferrule until the ferrule end of the tip section abuts the second inner wall 280.

As shown in FIGS. 30A-31B, a first tightly fitted plug 286 may be inserted into the ferrule end 112 of the butt section 104 before installing the female portion 108' of the ferrule 106' on the butt section, and a second tightly fitted plug 288 may be inserted into the ferrule end 114 of the tip section 102 before installing the male portion 110 of the ferrule on the tip section 102. The first 286 and second plugs 288 may be constructed from fiberglass that most closely resembles the modulus of the fishing rod sections. Other suitable materials may also be used. For example, "E" or "S" fiberglass may be used depending upon the flexing requirements of the rod. The second plug 288 may also be fitted to the taper of the inner wall of the tip section 102. The plugs act to carry the load stresses generated between the carbon fiber ferrule and the bamboo during casting. Unless the plugs spread the loads across the ferrule and along a portion of the length of rod, the rod may break at the ferrule junction during use. Various types of epoxy may be used to pot both plugs as well as secure the ferrule portions to the rod sections. For example, one embodiment of the present invention utilizes 3-M DP100 epoxy adhesive. The distance the plugs extend into the tip and butt sections beyond the first and second rod sections of the ferrule portions may vary. In one embodiment, the first plug 286 may extend into the butt section 104 a distance of at least twice the length of the first rod section 274 of the female ferrule portion 108', and the second plug 288 may extend from two to three times the length that the second rod section 282 of the male ferrule portion 110'. The butt end 112 of the butt section 104 may also be plugged to provide additional strength to the butt section and help prevent moisture from entering the center of the rod. In one embodiment of the present invention the butt end is plugged with a tightly fitted tapered dowel of birch wood that extends into the butt section a distance of 1.5 inches and is securely sealed in place with epoxy adhesive.

Once the ferrule portions (108, 110) are connected with the butt 104 and tip sections 102 of the rod, cork for the grip may be attached to the butt section, which is turned to a desired shape. A stripping guide, line guides, and the tip top may also be attached using thread and epoxy. The spacing between the guides may be increased and the number of guides used reduced, and the overall length of thread wraps along with subsequent wrap coatings may also be minimized to reduce weight. The wraps may be coated with clear flexible coating and allowed to air dry. The rod may then be prepared for coating using steel wool, the dust removed, and the rod sprayed with a clear, flexible, urethane coating and allowed to air dry in a dust-free box.

Various types of reel seats 116 and barrels 118 may be also used with the present invention. In one embodiment, the reel seat may be made from anodized aluminum or nickel silver, which may be attached to the rod with epoxy adhesive. In another embodiment, the barrel may be manufactured from golden willow wood, air dried (cured) over 12 months, blocked, cut to rough size on a lathe, and drilled. The barrel may then be immersed in wood hardener under maximum vacuum dependant upon ambient atmospheric pressure until gases are removed, and allowed to air dry. The tube of hardened wood may then be machined on a lathe to the dimensional demands of the seat, polished, coated, and attached to the seat using epoxy adhesive.

Many of the methods and structures disclosed herein are applicable to fishing rods constructed from various other types of materials besides bamboo, such as graphite. The application of the present invention provides for a fishing rod that may include two more sections selectively connectable through a ferrule, or may include only one section. One embodiment of the invention disclosed herein provides for a fishing rod constructed from a process of assembling bamboo splines with rilled inner walls coated with epoxy that are exposed to heat in a vacuum. The resulting rod according to the present invention may have a larger diameter to allow for the reduction in bamboo mass without losing strength and performance. It is to be appreciated that additional measures may be taken by the rod builder to further reduce the mass of the fishing rod. For example, the line guides may be spaced at wider distances from normally accepted spacing standards along the length of the rod, which may result in the elimination of at least one line guide. In addition, the tip top may be shortened from its stock size. In one embodiment of the present invention, the tip top is shortened by a length of 0.010 inches from its stock size. The thread wraps may also be shorter than traditional wraps found on bamboo, which provides for less coating area, which helps to reduce the swing weight, and the coating on the wraps may be held to a minimum. Furthermore, a rod builder may use a high quality auto urethane, which may produce a lighter and tougher protective coating than traditional varnish. In sum, the present invention allows a rod builder to construct a rod having desired feel by manipulating the design factors that may limit a rod's performance.

Although various embodiments of this invention have been described above with a certain degree of particularity or with reference to one or more individual embodiments, those skilled in the art could make numerous alterations to those disclosed embodiments without departing from the spirit or scope of this invention. It is intended that all matter contained in the above description and shown in the accompanying drawings shall be interpreted as illustrative only of particular embodiments, and not limiting. Changes in detail or structure may be made without departing from the basic elements of the invention as defined in the following claims.

What is claimed is:

1. A method of constructing a fishing rod comprising a tip section and a butt section from a plurality of bamboo splines comprising:
    removing pith from inner walls of the bamboo splines;
    applying a coating of stiffener to the inner walls of the bamboo splines;
    gluing the splines together to form a rod having a polygonal cross section;
    placing the rod in a vacuum;
    baking the rod;
    inserting the butt section in a first mold;
    applying a first vacuum pressure to the first mold;
    hanging the first mold vertically in an oven;
    inserting the tip section in a second mold;
    applying a second vacuum pressure to the second mold;
    hanging the second mold vertically in an oven;
    changing the first and second vacuum pressures to a third vacuum pressure and a fourth vacuum pressure; and
    suspending the first and second molds vertically at ambient pressure and temperature.

2. The method of claim 1, wherein applying a first vacuum pressure further comprises placing the first mold in a first vacuum bag with a first pressure of −5 inches of mercury.

3. The method of claim 1, wherein applying a second vacuum pressure further comprises placing the second mold in a second vacuum bag with a second pressure of −5 inches of mercury.

4. The method of claim 1, further comprising setting the oven to a temperature of 180 degrees Fahrenheit.

5. The method of claim 1, wherein the third vacuum pressure is −12 inches of mercury and the fourth vacuum pressure is −12 inches of mercury.

6. The method of claim 1, further comprising:
    returning the first and second molds to the oven;
    setting fifth and sixth vacuum pressures; and
    allowing the first and second molds to return to ambient pressure and temperature.

7. The method of claim 6, further comprising setting the oven temperature to 210 degrees Fahrenheit.

8. The method of claim 6, wherein the fifth and sixth pressures are −10 inches of mercury.

9. The method of claim 6, wherein returning the first and second molds to the oven further includes suspending the first and second molds vertically oriented 180 degrees from a previous orientation when previously hanging in the oven.

\* \* \* \* \*